US010965498B2

(12) United States Patent
Hirose et al.

(10) Patent No.: US 10,965,498 B2
(45) Date of Patent: Mar. 30, 2021

(54) COMMUNICATION RELAY APPARATUS AND AIR-CONDITIONING SYSTEM

(71) Applicant: Mitsubishi Electric Corporation, Tokyo (JP)

(72) Inventors: Katsuhiro Hirose, Tokyo (JP); Kazuo Maeda, Tokyo (JP); Koji Rikukawa, Tokyo (JP); Jun Someya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 143 days.

(21) Appl. No.: 16/088,113

(22) PCT Filed: Jun. 3, 2016

(86) PCT No.: PCT/JP2016/066645
§ 371 (c)(1),
(2) Date: Sep. 25, 2018

(87) PCT Pub. No.: WO2017/208452
PCT Pub. Date: Dec. 7, 2017

(65) Prior Publication Data
US 2019/0089558 A1  Mar. 21, 2019

(51) Int. Cl.
*H04L 12/66* (2006.01)
*H04L 12/28* (2006.01)
(Continued)

(52) U.S. Cl.
CPC .............. *H04L 12/66* (2013.01); *H04L 12/28* (2013.01); *H04L 12/40091* (2013.01);
(Continued)

(58) Field of Classification Search
None
See application file for complete search history.

(56) References Cited

U.S. PATENT DOCUMENTS

2002/0051459 A1* 5/2002 Denecheau ....... H04L 29/12009
370/409
2006/0090483 A1* 5/2006 Kim .......................... F24F 11/30
62/126
(Continued)

FOREIGN PATENT DOCUMENTS

| JP | H05-260063 A | 10/1993 |
| WO | 2014/115316 A1 | 7/2014 |
| WO | 2014/115317 A1 | 7/2014 |

OTHER PUBLICATIONS

International Search Report of the International Searching Authority dated Aug. 9, 2016 for the corresponding international application No. PCT/JP2016/066645 (and English translation).

*Primary Examiner* — James P Duffy
(74) *Attorney, Agent, or Firm* — Posz Law Group, PLC

(57) ABSTRACT

Provided is a communication relay apparatus configured to relay communication between a plurality of segments of a network by a plurality of communication devices including an indoor unit and an outdoor unit connected to one another via the network, the communication relay apparatus including a relay setting unit configured to set a first mode value corresponding to processing of relaying all frames and a second mode value corresponding to processing of relaying a frame on the basis of a destination address of the frame, and a relay determination unit configured to perform processing of relaying the frame in an operation mode corresponding to a relay mode value set by the relay setting unit.

11 Claims, 21 Drawing Sheets

(51) Int. Cl.
    *H04Q 9/00*          (2006.01)
    *H04L 12/40*        (2006.01)
    *H04L 12/46*        (2006.01)
    *H04L 1/00*          (2006.01)

(52) U.S. Cl.
    CPC ........... *H04L 12/4625* (2013.01); *H04Q 9/00* (2013.01); *H04L 2001/0097* (2013.01)

(56) References Cited

U.S. PATENT DOCUMENTS

| | | |
|---|---|---|
| 2008/0310403 A1* | 12/2008 | Asoh ................ H04L 12/66 370/352 |
| 2015/0308702 A1 | 10/2015 | Yabuta et al. |
| 2015/0308707 A1 | 10/2015 | Tanaka et al. |

\* cited by examiner

FIG. 4
| PR | SA | DA | CC | BC | DATA | FCC | ACK |
PR: PRIORITY LEVEL
(STORE PRIORITY LEVEL AT TIME OF FRAME COLLISION)
SA: SELF ADDRESS
DA: DESTINATION ADDRESS
CC: CONTROL CODE
BC: BLOCK LENGTH CODE
DATA: DATA
FCC: FRAME CHECK CODE
ACK: ACKNOWLEDGEMENT
FIG. 5
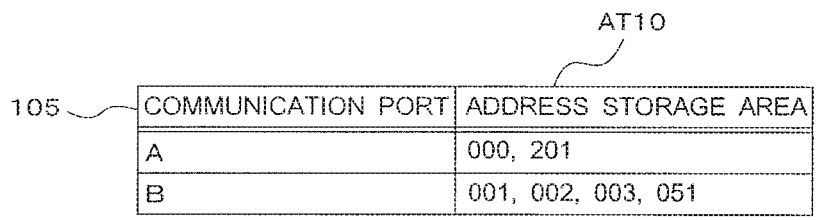
FIG. 6
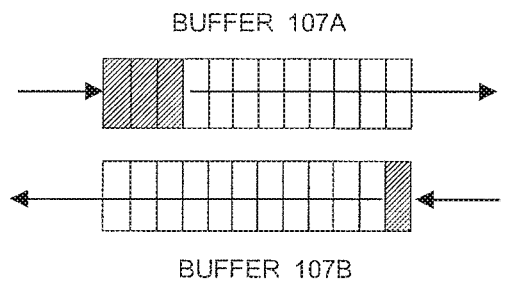
FIG. 7
| PRIORITY LEVEL | b0 | b1 |
|---|---|---|
| 1 | 0 | 0 |
| 2 | 0 | 1 |
| 3 | 1 | 0 |
| 4 | 1 | 1 |
(PRIORITY LEVEL. 1 > 2 > 3 > 4)

COMMAND: SETTING UNIT ON, SETTING UNIT OFF
OPERAND 1: COMMUNICATION PORT A, COMMUNICATION PORT B, BOTH PORTS

| DATA | | |
|---|---|---|
| COMMAND | OPERAND 1 | OPERAND 2 |

COMMAND: ADD ADDRESS, DELETE ADDRESS
OPERAND 1: COMMUNICATION PORT A, COMMUNICATION PORT B, BOTH PORTS
OPERAND 2: VALUE OF ADDRESS

COMMAND: ADD DATA, DELETE DATA
OPERAND 1: COMMUNICATION PORT A, COMMUNICATION PORT B, BOTH PORTS
OPERAND 2: VALUE OF DATA

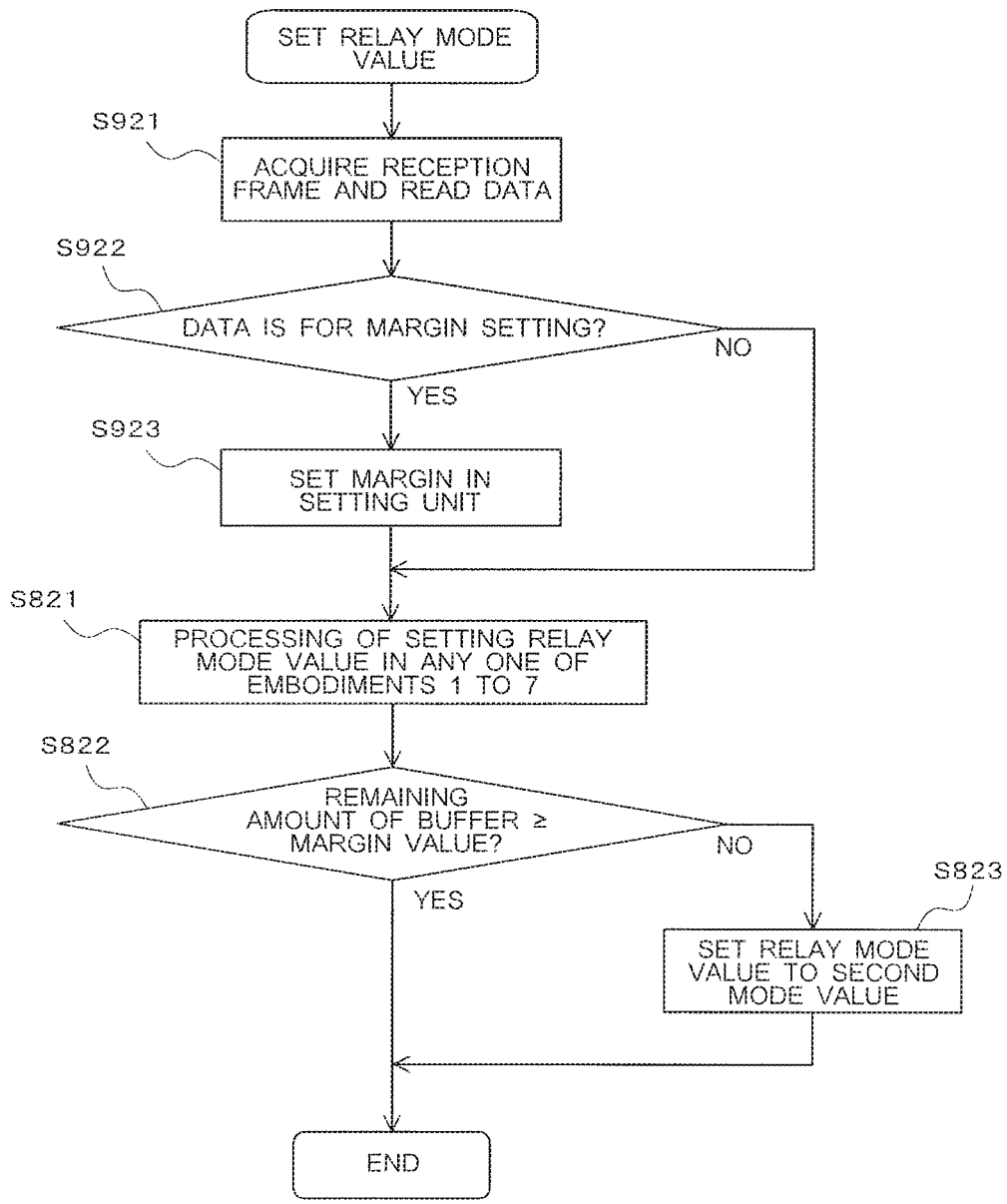

COMMUNICATION RELAY APPARATUS AND AIR-CONDITIONING SYSTEM

CROSS REFERENCE TO RELATED APPLICATION

This application is a U.S. national stage application of PCT/JP2016/066645 filed on Jun. 3, 2016, the contents of which are incorporated herein by reference.

TECHNICAL FIELD

The present invention relates to a communication relay apparatus configured to relay communication among a plurality of communication devices including an outdoor unit and an indoor unit, and to an air-conditioning system including communication devices connected to one another via a network.

BACKGROUND

Communication in an air-conditioning system includes communication for control and communication for operation.

Communication for control is used for controlling, for example, refrigerant. For example, the air-conditioning system adjusts an opening degree of an expansion valve or a rotation frequency of a compressor on the basis of temperature information on refrigerant, which is communicated among communication devices, and other information, to thereby control the temperature of the refrigerant. That is, for example, communication of temperature information on refrigerant is classified into communication for control.

In communication for control, control performance deteriorates due to communication delay. For example, when communication delay occurs in communication of temperature information on refrigerant, control of the temperature of refrigerant has an increased hunting width in proportion to delay time, and as a result, the control performance deteriorates. In short, communication for control is characterized in that communication delay is not allowed.

Meanwhile, communication for operation is used for, for example, an operation of a system controller by a user or display on the system controller. For example, the system controller displays an indoor temperature for the user, and thus performs communication to inquire of an indoor unit about the indoor temperature. That is, for example, communication of indoor temperature, which is performed between the system controller and the indoor unit, is classified into communication for operation.

Communication delay does not cause a problem in communication for operation in many cases. For example, when communication delay occurs in communication of indoor temperature, the indoor temperature is displayed on the system controller after the elapse of the delay time. However, the indoor temperature hardly changes during the delay time, and thus the communication delay does not cause a problem in many cases in communication of indoor temperature. In short, communication for operation is characterized in that communication delay is permitted more compared to communication for control.

A communication device connected to an air-conditioning system can perform communication when a communication port of the air-conditioning system is not occupied. The communication port has a high occupancy when communication traffic is large, and thus a large amount of time is required until the communication port becomes unoccupied. In other words, a communication device connected to the air-conditioning system has a large communication delay when communication traffic is large. Besides, a communication delay is not permitted in communication for control. Consequently, communication traffic in the air-conditioning system is desired to be lowered.

There has been known a method of using a repeater as a method of relaying communication in an air-conditioning system. The repeater also relays communication that is handled in each segment and is not required to be relayed, and as a result, communication traffic increases. Further, the repeater has a function of increasing an attenuated transmission waveform, and thus the repeater can be used to increase a transmission distance. However, communication in an air-conditioning system causes deviation in phase of the transmission waveform by a transmission delay when the transmission distance increases, with the result that each communication device cannot identify a transmission waveform and communication is disabled. Thus, the transmission distance in the air-conditioning system is limited, and the number of repeaters to be cascade-connected is also limited. Further, when the transmission waveform contains noise, the repeater amplifies and relays the noise, and as a result, communication across segments is more likely to have an abnormality due to the noise.

There is known a method of using a bridge as a method of preventing leakage of communication that is handled in each segment. The bridge is configured to manage destination information on communication devices connected to each segment, and to determine whether to allow relay on the basis of the destination information on communication devices, to thereby relay communication across segments and block communication that is handled in each segment. Thus, when a bridge is used, it is possible to reduce communication traffic compared to a case of using a repeater.

Further, the bridge physically blocks communication between segments, and thus the communication delay does not occur across segments. As a result, the transmission distance in an air-conditioning system is limited to each segment, but bridges can be cascade-connected to unlimitedly increase the transmission distance in the air-conditioning system. Further, the bridge relays communication through identification of a transmission waveform, and thus even when the transmission waveform contains noise, the noise can be blocked. Consequently, it is possible to prevent noise from causing a communication abnormality across segments.

A typical bridge determines whether to relay communication on the basis of the destination information on communication devices. Thus, when a typical bridge is introduced to an air-conditioning system, a communication device that utilizes communication addressed to another component may not be able to utilize the communication addressed to another component. In other words, a communication device that performs control in synchronization with communication addressed to another component may not be able to utilize communication that serves to trigger the control, namely, communication that is required for the control.

Specifically, for example, an operator registers in advance specifics of some communication and details of control that is performed at a time of the communication in a general-purpose device controller of Patent Literature 1. Then, the general-purpose device controller monitors the communication registered in advance to perform control corresponding to the communication registered in advance in synchronization with execution of the communication. However, when a typical bridge is introduced to an air-conditioning system of Patent Literature 1, the communication registered in advance may be blocked, and thus the general-purpose device controller may not be able to perform the control registered in advance.

Further, some communication relay apparatus perform relay processing that depends on the magnitude of communication traffic to reduce increase in communication traffic (e.g., refer to Patent Literature 2). A communication relay apparatus of Patent Literature 2 transmits all pieces of data when communication traffic is smaller than a restriction value, and performs data communication that is based on destination address information when communication traffic exceeds the restriction value.

Patent Literature

Patent Literature 1: WO 14/115317
Patent Literature 2: Japanese Unexamined Patent Application Publication No. 05-260063

However, when communication traffic is large, the communication relay apparatus of Patent Literature 2 executes data communication that is based on destination address information. Thus, communication registered in advance may be blocked, and the general-purpose device controller may not be able to perform control in synchronization with the communication also when the communication relay apparatus of Patent Literature 2 is introduced to the air-conditioning system of Patent Literature 1. In other words, a communication device that utilizes communication addressed to another component may not be able to utilize the communication addressed to another component also when the communication relay apparatus of Patent Literature 2 is used as the communication relay apparatus of the air-conditioning system. Meanwhile, when a repeater is used as the communication relay apparatus of the air-conditioning system, all the communication is blocked, and thus communication traffic cannot be reduced.

SUMMARY

The present invention has been made to solve the above-mentioned problem, and has an object to provide a communication relay apparatus and an air-conditioning system that are configured to relay, to a communication device that performs control in synchronization with communication addressed to another component, communication that triggers the control, and to achieve reduction of communication traffic.

According to an embodiment of the present invention, there is provided a communication relay apparatus configured to relay communication between a plurality of segments of a network by a plurality of communication devices including an indoor unit and an outdoor unit connected to one another via the network, the communication relay apparatus including a plurality of communication ports each corresponding to a corresponding one of the plurality of segments, a plurality of reception units each configured to receive a frame from a corresponding one of the plurality of segments, an address table, in which information on addresses of the plurality of communication devices in each of the plurality of segments is registered in association with a corresponding one of the plurality of communication ports, a buffer configured to temporarily store the frame, a relay setting unit configured to set, as a relay mode value corresponding to an operation mode of processing of relaying the frame, a first mode value corresponding to processing of relaying all frames and a second mode value corresponding to processing of relaying a frame on the basis of a destination address of the frame, a relay determination unit configured to perform processing of relaying the frame in an operation mode corresponding to the relay mode value set by the relay setting unit, and a plurality of transmission units each configured to transmit the frame temporarily stored in the buffer to one of the plurality of segments that is different from another one of the plurality of segments that is a transmission source of the frame. The relay determination unit is configured to temporarily store the frame into the buffer when the first mode value is set as the relay mode value, or when the second mode value is set as the relay mode value and the destination address of the frame received by one of the plurality of reception units is present in the address table.

According to an embodiment of the present invention, the operation mode of relay processing is switched depending on the relay mode value set by the relay setting unit, and thus frames that are required to be relayed can all be relayed, whereas frames that are not necessarily required to be relayed can be relayed or blocked on the basis of the destination information on communication devices. Consequently, it is possible to relay, to a communication device that performs control in synchronization with communication addressed to another component, communication that triggers the control, and to achieve reduction of communication traffic.

BRIEF DESCRIPTION OF DRAWINGS

FIG. 4 is an explanatory diagram for illustrating an exemplary configuration of each frame relayed by the communication relay apparatus of FIG. 3.

FIG. 5 is an explanatory diagram for illustrating an exemplary configuration of an address table included in the communication relay apparatus of FIG. 3.

FIG. 6 is a schematic diagram for illustrating an exemplary configuration of each buffer included in the communication relay apparatus of FIG. 3.

FIG. 7 is an explanatory diagram for exemplifying a method of setting a code indicating a priority level at a time of collision between frames.

FIG. 28 is an explanatory diagram for illustrating details of data for margin setting included in a frame received by a reception unit of the communication relay apparatus of FIG. 27.

FIG. 29 is a flowchart for illustrating an operation of processing of setting a relay mode value by a relay setting unit of FIG. 27.

DETAILED DESCRIPTION

Embodiment 1

Figure 1:
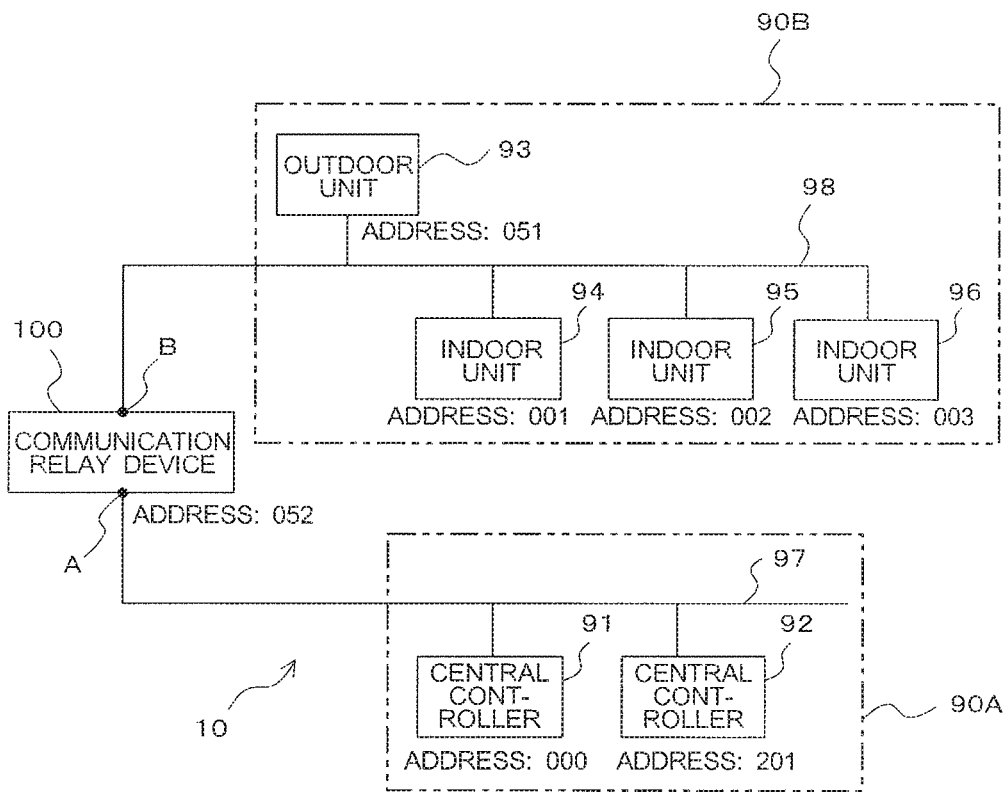
FIG. 1 is a block diagram for illustrating a configuration of an air-conditioning system according to Embodiment 1 of the present invention.

FIG. 1 is a block diagram for illustrating a configuration of an air-conditioning system (air-conditioning cooling system) according to Embodiment 1 of the present invention. As illustrated in FIG. 1, an air-conditioning system 10 includes, as a plurality of communication devices, central controllers 91 and 92, an outdoor unit 93, indoor units 94 to 96, and a communication relay apparatus 100. The central controllers 91 and 92 are connected to each other via a bus 97 of a segment 90A, and the outdoor unit 93 and the indoor units 94 to 96 are connected to one another via a bus 98 of a segment 90B.

The central controllers 91 and 92 are configured to receive an operation on the air-conditioning system 10 to transmit operation control signals to the outdoor unit 93 and the indoor units 94 to 96. The central controllers 91 and 92 each include a display (not shown) made of, for example, a liquid display panel.

Further, the central controllers 91 and 92 each have a function of monitoring communication among the outdoor unit 93 and the indoor units 94 to 96. Further, the central controllers 91 and 92 are each configured to perform various kinds of control in synchronization with specific communication performed among the outdoor unit 93 and the indoor units 94 to 96.

In short, in Embodiment 1, the central controllers 91 and 92 are each a communication device configured to perform synchronized control that is control performed in synchronization with communication addressed to another component. Further, the outdoor unit 93 and the indoor units 94 to 96 are each a communication device configured to perform communication that triggers the central controllers 91 and 92 to perform synchronized control. A communication device configured to perform synchronized control is hereinafter also referred to as "synchronized communication device."

When the outdoor unit 93 and the indoor units 94 to 96 communicate with one another in such a manner as to trigger synchronized control, for example, the central controllers 91 and 92 perform, as synchronized control, control of switching display on the display in synchronization with the communication, or processing of storing details of the communication and a history of an operation into, for example, an internal memory (not shown).

The communication relay apparatus 100 includes a communication port A, to which the bus 97 is connected, and a communication port B, to which the bus 98 is connected. The communication port A is connected to the segment 90A. The communication port B is connected to the segment 90B. The communication relay apparatus 100 is configured to perform processing of relaying communication between the segment 90A and the segment 90B via the communication ports A and B. The communication port A and the communication port B are also hereinafter sometimes simply referred to as a "communication port" without distinction.

Further, as illustrated in FIG. 1, each communication device has a set unique address for communication. In an example of FIG. 1, an address of the central controller 91 is set to "000," and an address of the central controller 92 is set to "201." An address of the outdoor unit 93 is set to "051," and addresses of the indoor units 94 to 96 are set to "001" to "003," respectively. An address of the communication relay apparatus 100 is set to "052."

Figure 2:
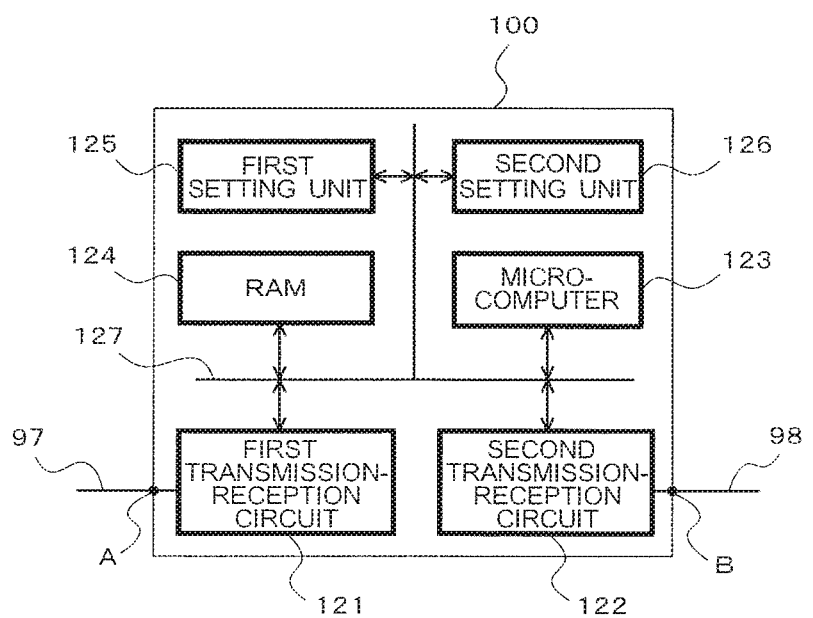
FIG. 2 is a block diagram for exemplifying a physical configuration of a communication relay apparatus included in the air-conditioning system of FIG. 1.

FIG. 2 is a block diagram for exemplifying a physical configuration of the communication relay apparatus 100. The communication relay apparatus 100 includes a first transmission-reception circuit 121, a second transmission-reception circuit 122, a microcomputer 123, a RAM 124, a first setting unit 125, and a second setting unit 126. The first transmission-reception circuit 121, the second transmission-reception circuit 122, the microcomputer 123, the RAM 124, the first setting unit 125, and the second setting unit 126 are connected to one another via an internal bus 127. Further, the first transmission-reception circuit 121 is connected to the communication port A, and the second transmission-reception circuit 122 is connected to the communication port B. The first setting unit 125 and the second setting unit 126 are also hereinafter sometimes simply referred to as a "setting unit" without distinction. The same holds true for Embodiment 2 to Embodiment 9 described later.

The first transmission-reception circuit 121 is configured to receive a frame from the segment 90A via the communication port A. The second transmission-reception circuit 122 is configured to receive a frame from the segment 90B via the communication port B. Further, the first transmission-reception circuit 121 monitors whether the communication port A is occupied at the start of transmission, and starts transmission at a time when the communication port A is not occupied. In other words, when the communication port A is occupied, the first transmission-reception circuit 121 starts to transmit a frame after the communication port A becomes unoccupied. Similarly, the second transmission-reception circuit 122 monitors whether the communication port B is occupied at the start of transmission, and starts transmission at a time when the communication port B is not occupied. In other words, when the communication port B is occupied, the second transmission-reception circuit 122 starts to transmit a frame after the communication port B becomes unoccupied.

The microcomputer 123 is configured to determine whether to relay a frame received by the first transmission-reception circuit 121 or the second transmission-reception circuit 122, and store, into the RAM 124, a frame that is determined as being required to be relayed. That is, the first transmission-reception circuit 121 is configured to transmit, via the communication port A, a frame that is stored by the microcomputer 123 into the RAM 124. The second transmission-reception circuit 122 is configured to transmit, via the communication port B, a frame that is stored by the microcomputer 123 into the RAM 124. The above-mentioned functions implemented by the microcomputer 123 may be implemented by cooperation among a plurality of processing circuits.

The first setting unit 125 and the second setting unit 126 can each switch between on and off states in response to a setting operation from the outside, and holds a value corresponding to the on state or a value corresponding to the off state. The value corresponding to the on state is hereinafter referred to as an "on value," and the value corresponding to the off state is hereinafter referred to as an "off value." The "on value" and the "off value" can be read by the microcomputer 123. Further, the on value or off value set by the first setting unit 125 is also referred to as a "value of first setting unit 125," and the on value or off value set by the second setting unit 126 is also referred to as a "value of second setting unit 126."

For example, the first setting unit 125 or the second setting unit 126 may be capable of mechanically brought into the on state or off state.

Further, the first setting unit 125 may include a memory for storing information, and store the value of the first setting unit 125 that is information indicating the state of the first setting unit 125 into the memory. In this case, the first setting unit 125 may determine whether to be brought into the on state or off state on the basis of details of a frame acquired via the communication port A. Then, the first setting unit 125 may store a value corresponding to the determined state into the memory as the value of the first setting unit 125.

Similarly, the second setting unit 126 may include a memory for storing information, and store the value of the second setting unit 126 that is information indicating the state of the second setting unit 126 into the memory. In this case, the second setting unit 126 may determine whether to be brought into the on state or off state on the basis of details of a frame acquired via the communication port B. Then, the second setting unit 126 may store a value corresponding to the determined state into the memory as the value of the second setting unit 126.

Figure 3:
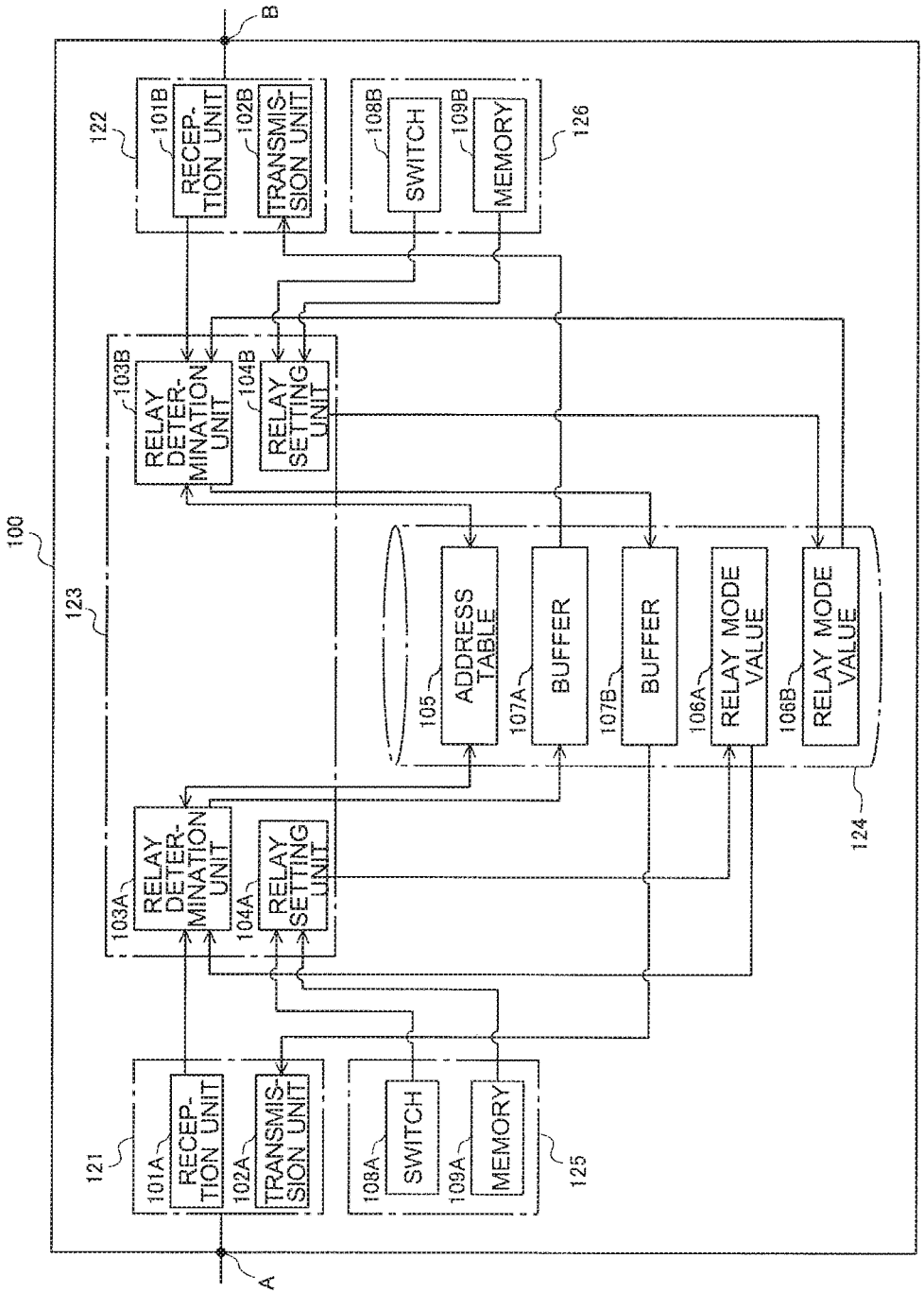
FIG. 3 is a block diagram for illustrating a functional configuration of the communication relay apparatus of FIG. 2.

FIG. 3 is a block diagram for illustrating a functional configuration of the communication relay apparatus 100. As illustrated in FIG. 3, the first transmission-reception circuit 121 includes a reception unit 101A and a transmission unit 102A, and the second transmission-reception circuit 122 includes a reception unit 101B and a transmission unit 102B. The reception unit 101A is configured to receive a frame from the segment 90A. The reception unit 101B is configured to receive a frame from the segment 90B. The microcomputer 123 includes a relay determination unit 103A, a relay determination unit 103B, a relay setting unit 104A, and a relay setting unit 104B.

The relay determination unit 103A and the relay determination unit 103B are also hereinafter sometimes simply referred to as a "relay determination unit 103" without distinction. Similarly, the relay setting unit 104A and the relay setting unit 104B are also hereinafter sometimes simply referred to as a "relay setting unit 104" without distinction. Further, the reception unit 101A and the reception unit 101B are also hereinafter sometimes simply referred to as a "reception unit 101" without distinction. Similarly, the transmission unit 102A and the transmission unit 102B are also hereinafter sometimes simply referred to as a "transmission unit 102" without distinction. Each above-mentioned general term holds true for Embodiment 2 to Embodiment 9 described later.

The RAM 124 stores an address table 105, in which addresses of communication devices in each of the plurality of segments 90A and 90B are registered, and a relay mode value 106A and a relay mode value 106B that are variables serving as information on relay processing by the communication relay apparatus 100. The relay mode value 106A is information indicating an operation mode of processing of relaying a frame input to the communication port A. The relay mode value 106B is information indicating an operation mode of processing of relaying a frame input to the communication port B.

The operation mode includes a repeater mode corresponding to processing of relaying all the frames and a bridge mode corresponding to processing of relaying a frame on the basis of a destination address of the frame. The relay mode value 106A and the relay mode value 106B are set to a "first mode value" that is information indicating the repeater mode or to a "second mode value" that is information indicating the bridge mode.

Further, the RAM 124 serves as buffers 107A and 107B. The transmission units 102A and 102B are configured to transmit frames temporarily stored in the buffers 107B and 107A to segments different from those of transmission sources, respectively. The buffer 107A and the buffer 107B are also hereinafter sometimes simply referred to as a "buffer" without distinction. The same holds true for Embodiment 2 to Embodiment 9 described later.

The first setting unit 125 includes a switch 108A and a memory 109A. The switch 108A mechanically holds the value of the first setting unit 125. The memory 109A stores the value of the first setting unit 125. The second setting unit 126 includes a switch 108B and a memory 109B. The switch 108B mechanically holds the value of the second setting unit 126. The memory 109B stores the value of the second setting unit 126.

The value of the first setting unit 125 and the value of the second setting unit 126 are preferably set to freely-selected values by, for example, a designer of the air-conditioning system 10 at the time of, for example, installation of the communication relay apparatus 100.

In Embodiment 1, as an example, the first setting unit 125 includes both of the switch 108A and the memory 109A, and the second setting unit 126 includes both of the switch 108B and the memory 109B. However, the configuration is not limited to this example. That is, the first setting unit 125 may include at least one of the switch 108A and the memory 109A. Similarly, the second setting unit 126 may include at least one of the switch 108B and the memory 109B.

When the first setting unit 125 includes only the switch 108A, the switch 108A is preferably switch mechanically between on and off states and set the on value or off value as information indicating the state of the first setting unit 125. Similarly, when the second setting unit 126 includes only the switch 108B, the switch 108B is preferably switch mechanically between on and off states and set the on value or off value as information indicating the state of the second setting unit 126.

Further, when the first setting unit 125 includes only the memory 109A, a storage area of the memory 109A may store the on value or off value set at the time of, for example, manufacture of the communication relay apparatus 100. Similarly, when the second setting unit 126 includes only the memory 109B, a storage area of the memory 109B may store the on value or off value set at the time of, for example, manufacture of the communication relay apparatus 100.

The relay setting unit 104A is configured to set the relay mode value 106A on the basis of the value of the first setting unit 125. The relay setting unit 104B is configured to set the relay mode value 106B on the basis of the value of the second setting unit 126. The relay mode value 106A and the relay mode value 106B are also hereinafter simply referred to as a "relay mode value 106" without distinction. The same holds true for Embodiment 2 to Embodiment 9 described later.

FIG. 4 is an explanatory diagram for illustrating an exemplary configuration of each frame relayed by the communication relay apparatus 100. Each frame relayed by the communication relay apparatus 100 includes a code PR indicating a priority level at a time of collision between frames, a code SA indicating an address (source address) of a source of communication, and a code DA indicating an address (destination address) of a destination of the communication, which is an address of a recipient. Further, each frame includes a control code CC for control of communication, a block length code BC indicating a block length of a message, a code DATA indicating information that is communicated, a code FCC indicating a frame check code for identifying whether a frame is normal or abnormal, and a code ACK indicating acknowledgement.

The reception units 101A and 101B are each configured to check the frame check code FCC at the time of reception of a frame to determine whether the received frame is normal. When the reception unit 101A determines that the received frame is normal, the reception unit 101A passes the frame received via the communication port A to the relay determination unit 103A. When the reception unit 101B determines that the received frame is normal, the reception unit 101B passes the frame received via the communication port B to the relay determination unit 103B. Further, when the reception unit 101A or 101B determines that the received frame is abnormal, the reception unit 101A or 101B discards the received frame.

FIG. 5 is an explanatory diagram for illustrating an exemplary configuration of the address table 105 included in the communication relay apparatus 100. The communication relay apparatus 100 tries to communicate with all the addresses that may be assigned to communication devices at initial processing after the power is turned on, and stores an address of a communication device that the communication relay apparatus 100 has successfully communicated into an address storage area AT10 of the address table 105 for each communication port. That is, in the address table 105, information on addresses of communication devices in each of a plurality of segments is registered in association with a corresponding one of a plurality of communication ports.

A description is given below of an example of a procedure by the communication relay apparatus 100 of storing an address into the address table 105 in the initial processing. In the initial processing, the communication relay apparatus 100 transmits a frame for requesting a response to the central controller 91, which is a communication device having the address "000," via the communication ports A and B. At this time, when the communication relay apparatus 100 receives a response frame from the central controller 91 via the communication port A, the communication relay apparatus 100 stores the address "000" of the central controller 91, which has transmitted the response, into the address storage area AT10 of the address table 105 corresponding to the communication port A. The communication relay apparatus 100 performs the above-mentioned processing for all the addresses that may be assigned to communication devices, and stores an address of a communication device that has transmitted a response into the address storage area AT10 of the address table 105 for each communication port. In this manner, the communication relay apparatus 100 stores addresses of all the communication devices that are connected to each communication port.

A functional configuration of the microcomputer 123 is described below in more detail with reference to FIG. 3 to FIG. 5.

The relay setting unit 104A is configured to read the value of the first setting unit 125, identify which of the repeater mode and the bridge mode the operation mode is set to, and set the relay mode value 106A in accordance with the identified operation mode. The relay mode value 106A has two values, namely, the first mode value indicating the repeater mode and the second mode value indicating the bridge mode. For example, when the first setting unit 125 is in the on state, the relay setting unit 104A sets the relay mode value 106A to the first mode value, and when the first setting unit 125 is in the off state, the relay setting unit 104A sets the relay mode value 106A to the second mode value.

The relay determination unit 103A is configured to store a frame given by the reception unit 101A into the buffer 107A when the relay mode value 106A is the first mode value indicating the repeater mode. Further, the relay determination unit 103A is configured to determine whether a destination address of a frame received by the reception unit 101A is registered in the address table 105 when the relay mode value 106A is the second mode value indicating the bridge mode. Further, the relay determination unit 103A is configured to store a frame received and given by the reception unit 101A into the buffer 107A when the destination address of the frame is registered in the address table 105.

More specifically, when the relay mode value 106A is the first mode value, the relay determination unit 103A determines that the frame is required to be relayed. Further, when the relay mode value 106A is the second mode value and the destination communication device is located in a segment different from that of the source communication device, the relay determination unit 103A determines that the frame is required to be relayed. In other words, the relay determination unit 103A determines that a frame given by the reception unit 101A is required to be relayed when the relay mode value 106A is the second mode value and the destination address DA of the frame is not stored in the address storage area AT10 of the address table 105 corresponding to the communication port A and but stored in the address storage area AT10 corresponding to the communication port B.

The relay determination unit 103A stores a frame given by the reception unit 101A into the buffer 107A when the frame is determined to be required to be relayed. On the contrary, when the relay mode value 106A is the second mode value and the destination address DA of the frame given by the reception unit 101A is not stored in the address storage area AT10 corresponding to the communication port B, the destination communication device is not present. Thus, in this case, the relay determination unit 103A determines that the frame is not required to be relayed, and discards the frame given by the reception unit 101A without storage into the buffer 107A.

The relay setting unit 104B is configured to read the value of the second setting unit 126, identify which of the repeater mode and the bridge mode the operation mode is set to, and set the relay mode value 106B in accordance with the identified operation mode. The relay mode value 106B has two values, namely, the first mode value indicating the repeater mode and the second mode value indicating the bridge mode. For example, when the second setting unit 126 is in the on state, the relay setting unit 104B sets the relay mode value 106B to the first mode value, and when the second setting unit 126 is in the off state, the relay setting unit 104B sets the relay mode value 106B to the second mode value.

The relay determination unit 103B is configured to store a frame given by the reception unit 101B into the buffer 107B when the relay mode value 106B is the first mode value indicating the repeater mode. Further, the relay determination unit 103B is configured to determine whether a destination address of a frame received by the reception unit 101B is registered in the address table 105 when the relay mode value 106B is the second mode value indicating the bridge mode. Further, the relay determination unit 103B is configured to store a frame received and given by the reception unit 101B into the buffer 107B when the destination address of the frame is registered in the address table 105.

More specifically, when the relay mode value 106B is the first mode value, the relay determination unit 103B determines that the frame is required to be relayed. Further, when the relay mode value 106B is the second mode value and the destination communication device is located in a segment different from that of the source communication device, the relay determination unit 103B determines that the frame is required to be relayed. In other words, the relay determination unit 103B determines that a frame given by the reception unit 101B is required to be relayed when the relay mode value 106B is the second mode value and the destination address DA of the frame is not stored in the address storage area AT10 of the address table 105 corresponding to the communication port B and but stored in the address storage area AT10 corresponding to the communication port A, which is another communication port.

The relay determination unit 103B stores a frame given by the reception unit 101B into the buffer 107B when the frame is determined to be required to be relayed. On the contrary, when the relay mode value 106B is the second mode value and the destination address DA of the frame given by the reception unit 101B is not stored in the address storage area AT10 corresponding to the communication port A, the destination communication device is not present. Thus, in this case, the relay determination unit 103B determines that the frame is not required to be relayed, and discards the frame given by the reception unit 101B without storage into the buffer 107B.

In short, the relay setting unit 104 is configured to set the first mode value corresponding to the processing of relaying all the frames and the second mode value corresponding to the processing of relaying a frame on the basis of the destination address of the frame. The relay determination unit 103 is configured to store a frame to be relayed into the buffer when the relay mode value 106 is the first mode value. Further, the relay determination unit 103 is configured to store a frame to be relayed into the buffer when the relay mode value 106 is the second mode value and the destination address of the frame is stored in the address storage area AT10 of a communication port other than the communication port corresponding to the relay determination unit 103.

FIG. 6 is a schematic diagram for illustrating an exemplary configuration of the buffers 107A and 107B included in the communication relay apparatus 100. The relay determination unit 103A stores a frame received via the communication port A into the buffer 107A for relay. The buffer 107A stores frames in order of reception of the frames. The transmission unit 102B transmits the frames stored in the buffer 107A in order from older frames. When the transmission unit 102B has transmitted a frame successfully, the transmission unit 102B deletes the successfully transmitted frame from the buffer 107A.

Further, the relay determination unit 103B stores a frame received via the communication port B into the buffer 107B for relay. The buffer 107B also stores frames in order of reception of the frames. The transmission unit 102A transmits the frames stored in the buffer 107B in order from older frames. When the transmission unit 102A has transmitted a frame successfully, the transmission unit 102A deletes the successfully transmitted frame from the buffer 107B.

On the contrary, when the transmission units 102A and 102B fail to transmit a frame, the transmission units 102A and 102B retransmit the frame until transmission is successful. Thus, frames to be transmitted next stored in the buffers 107A and 107B remain to be accumulated in the buffers 107A and 107B, respectively.

FIG. 7 is an explanatory diagram for exemplifying a method of setting the code PR indicating the priority level at the time of collision between frames. The first transmission-reception circuit 121 and the second transmission-reception circuit 122 monitor occupancy states of communication paths, and the transmission units 102A and 102B start to transmit a frame when the communication paths are not occupied. The transmission units 102A and 102B detect collision at the start of transmission, and when collision has occurred in communication, the frame to be prioritized is determined on the basis of the priority level PR illustrated in FIG. 4.

In the example of FIG. 7, a priority level 1 is set to a frame having the highest priority level. That is, the priority level is set to be lowered as the number indicated in a priority level column of FIG. 7 increases from 1, 2, 3, to 4. For example, when collision between a frame of the priority level 1 and a frame of the priority level 2 has occurred, the frame of the priority level 1 is prioritized and transmitted. The communication device that has transmitted the frame of the priority level 2 stops transmission due to detection of the collision, and retransmits the frame at a next time that allows transmission.

For example, in the air-conditioning system of FIG. 1, the central controllers 91 and 92 are connected to the communication port A, and the outdoor unit 93 and the indoor units 94 to 96 are connected to the communication port B. Thus, when the value of the first setting unit 125 is set to the on value, the relay mode value 106A is set to the first mode value indicating the repeater mode, and all the communication to the communication port A is relayed to the communication port B. With this configuration, the central controllers 91 and 92 can monitor communication with the outdoor unit 93 and the indoor units 94 to 96. Thus, the central controllers 91 and 92 can perform, for example, control of switching display on the display in synchronization with communication with the outdoor unit 93 and the indoor units 94 to 96. On the contrary, when the value of the second setting unit 126 is set to the off value, the relay mode value 106B is set to the second mode value indicating the bridge mode, and communication to the communication port B is relayed to or blocked from the communication port A in the bridge mode. In this manner, when the value of the second setting unit 126 is set to the off value corresponding to the bridge mode, it is possible to reduce communication traffic of the communication port A compared to the case of setting the value to the on value corresponding to the repeater mode, in which all the communication is relayed.

The communication relay apparatus 100 according to Embodiment 1 may include one relay determination unit 103 having both functions of the relay determination unit 103A and the relay determination unit 103B. Further, the communication relay apparatus 100 according to Embodiment 1 may include one relay setting unit 104 having both functions of the relay setting unit 104A and the relay setting unit 104B.

In short, the relay setting unit 104 is configured to set, as the relay mode value 106 corresponding to the operation mode of processing of relaying a frame, the first mode value corresponding to the processing of relaying all the frames and the second mode value corresponding to the processing of relaying a frame on the basis of the destination address of the frame. Then, when the first mode value is set by the relay setting unit 104, or when the second mode value is set by the relay setting unit 104 and the address table 105 stores the destination address of a frame received by the reception unit 101A or 101B, the relay determination unit 103 temporarily stores the frame into the buffer 107A or 107B.

Figure 8:
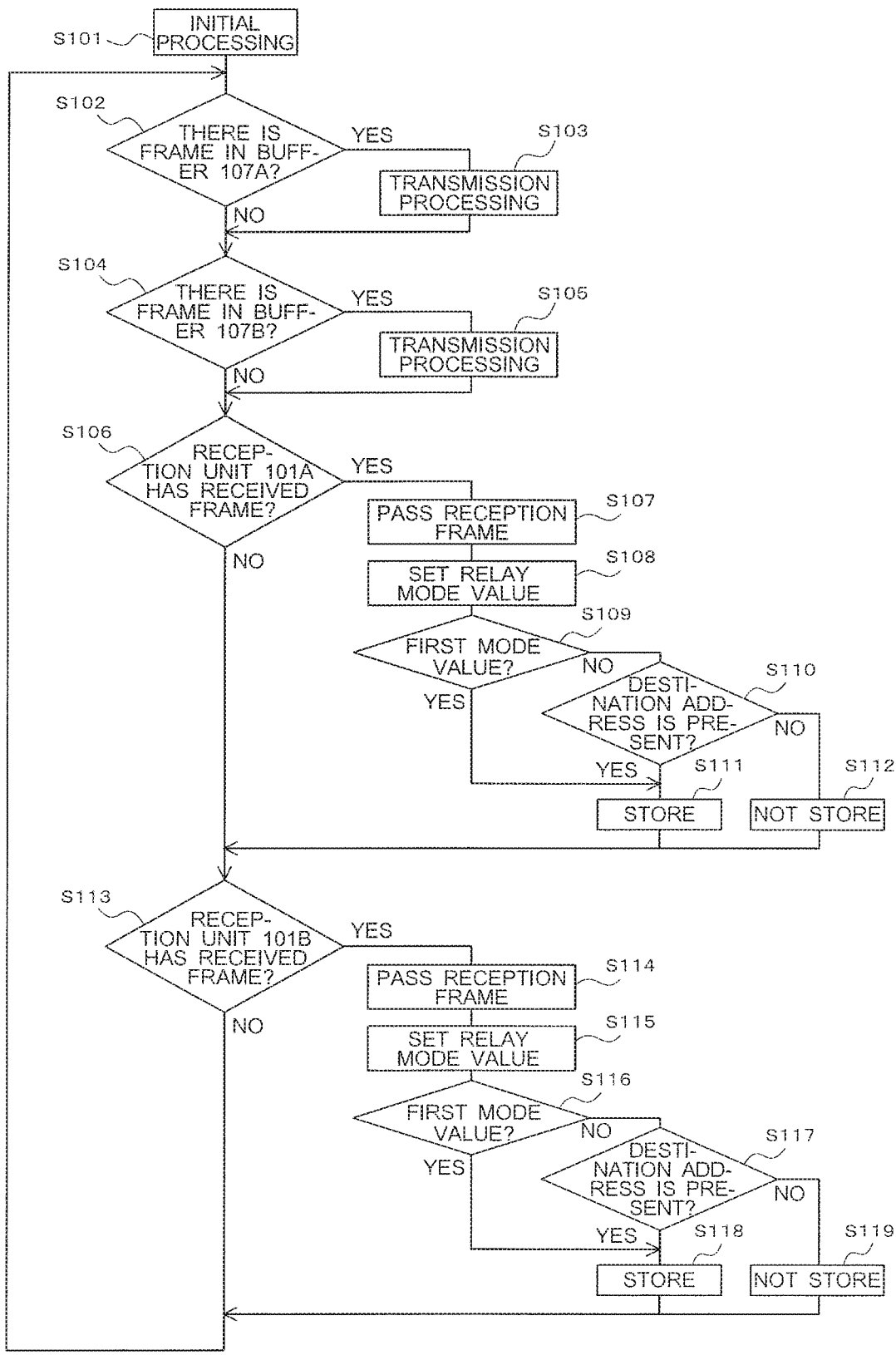
FIG. 8 is a flowchart for illustrating an overall operation of the communication relay apparatus of FIG. 3.

FIG. 8 is a flowchart for illustrating an entire operation of the communication relay apparatus 100. A description is given below of the entire operation of the communication relay apparatus 100 with reference to FIG. 8. First, as initial processing, the communication relay apparatus 100 tries to communicate with all the addresses to create the address table 105 (Step S101 of FIG. 8).

Next, the transmission unit 102B checks whether there is a frame in the buffer 107A (Step S102 of FIG. 8). When there is a frame in the buffer 107A (YES in Step S102 of FIG. 8), the transmission unit 102B executes processing of transmitting the frame in the buffer 107A (Step S103 of FIG. 8). On the contrary, when there is no frame in the buffer 107A (NO in Step S102 of FIG. 8), the processing proceeds to Step S104.

Further, the transmission unit 102A checks whether there is a frame in the buffer 107B (Step S104 of FIG. 8). When there is a frame in the buffer 107B (YES in Step S104 of FIG. 8), the transmission unit 102A executes processing of transmitting the frame in the buffer 107B (Step S105 of FIG. 8). On the contrary, when there is no frame in the buffer 107B (NO in Step S104 of FIG. 8), the processing proceeds to Step S106.

Next, the reception unit 101A checks whether there is a frame received via the communication port A (Step S106 of FIG. 8). When there is a received frame (YES in Step S106 of FIG. 8), the reception unit 101A passes the received frame to the relay determination unit 103A (Step S107 of FIG. 8). Then, the relay setting unit 104A sets the relay mode value 106A (Step S108 of FIG. 8).

Next, the relay determination unit 103A reads the relay mode value 106A to determine whether the relay mode value 106A is the first mode value indicating the repeater mode. That is, the relay determination unit 103A determines whether the operation mode is the repeater mode or the bridge mode on the basis of the relay mode value 106A (Step S109 of FIG. 8). Then, when the relay mode value 106A is the first mode value (YES in Step S109 of FIG. 8), the relay determination unit 103A stores the received frame into the buffer 107A (Step S111 of FIG. 8).

When the relay mode value 106A is not the first mode value (NO in Step S109 of FIG. 8), the relay determination unit 103A determines whether the destination address DA of the received frame is present in the address storage area AT10 of the address table 105 corresponding to the communication port B (Step S110 of FIG. 8). When the destination address DA of the received frame is present in the address table 105 (YES in Step S110 of FIG. 8), the relay determination unit 103A stores the received frame into the buffer 107A (Step S111 of FIG. 8). On the contrary, when the destination address DA of the received frame is not present in the address table 105 (NO in Step S110 of FIG. 8), the relay determination unit 103A does not store the received frame (Step S112 of FIG. 8).

Further, the reception unit 101B determines whether there is a frame received via the communication port B (Step S113 of FIG. 8). When there is a received frame (YES in Step S113 of FIG. 8), the reception unit 101B passes the received frame to the relay determination unit 103B (Step S114 of FIG. 8). Then, the relay setting unit 104B sets the relay mode value 106B (Step S115 of FIG. 8).

Further, the relay determination unit 103B reads the relay mode value 106B to determine whether the relay mode value 106B is the first mode value indicating the repeater mode (Step S116 of FIG. 8). When the relay mode value 106B is the first mode value (YES in Step S116 of FIG. 8), the relay determination unit 103B stores the received frame into the buffer 107B (Step S118 of FIG. 8).

When the relay mode value 106B is not the first mode value (NO in Step S116 of FIG. 8), the relay determination unit 103B determines whether the destination address DA of the received frame is present in the address storage area AT10 of the address table 105 corresponding to the communication port A (Step S117 of FIG. 8). When the destination address DA of the received frame is present in the address table 105 (YES in Step S117 of FIG. 8), the relay determination unit 103A stores the received frame into the buffer 107B (Step S118 of FIG. 8). On the contrary, when the destination address DA of the received frame is not present in the address table 105 (NO in Step S117 of FIG. 8), the relay determination unit 103A does not store the received frame (Step S119 of FIG. 8).

Next, the transmission unit 102B returns to the processing (Step S102 of FIG. 8) of determining whether there is a frame in the buffer 107A, and the communication relay apparatus 100 repeatedly executes the above-mentioned series of processing steps (Step S102 to Step S119 of FIG. 8).

The entire operation of the communication relay apparatus 100 has been described in order of numbers assigned in FIG. 8, but the configuration is not limited to the described order. For example, the processing of the transmission unit 102A and the processing of the transmission unit 102B may be executed in parallel. Further, the processing of the relay setting unit 104A and the relay determination unit 103A, and the processing of the relay setting unit 104B and the relay determination unit 103B may be executed in parallel.

Figure 9:
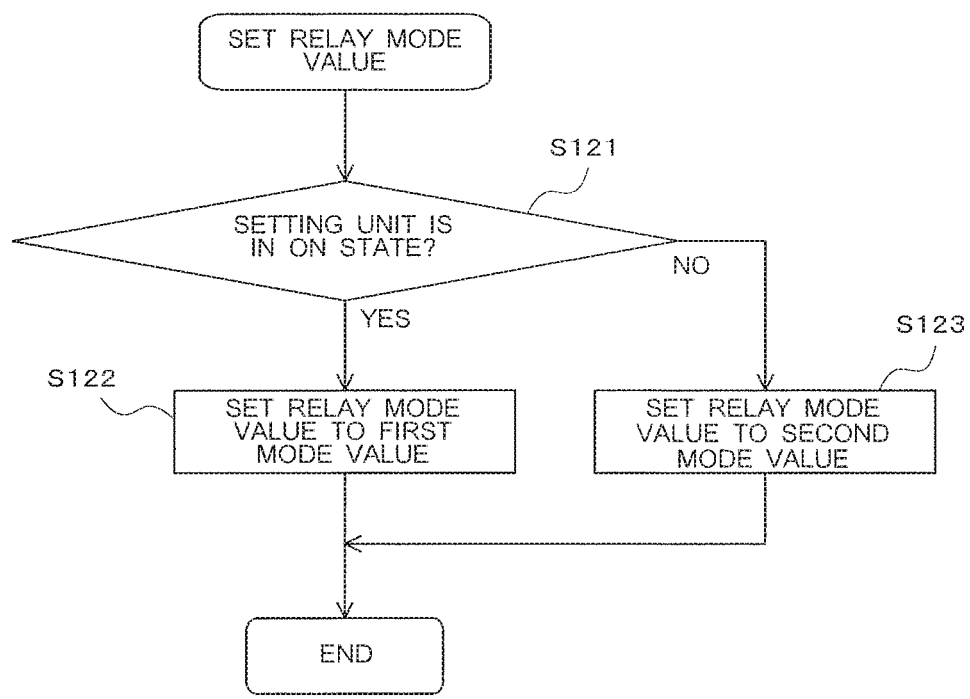
FIG. 9 is a flowchart for illustrating an operation of processing of setting a relay mode value by a relay setting unit of FIG. 3.

FIG. 9 is a flowchart for illustrating an operation of processing of setting the relay mode value 106 by the relay setting unit 104 of FIG. 3. A description is given below of the processing of setting the relay mode value illustrated in Step S108 and Step S115 of FIG. 8 with reference to FIG. 9.

[Step S108 of FIG. 8]

First, a description is given of the processing of setting the relay mode value 106A by the relay setting unit 104A.

The relay setting unit 104A reads the value of the first setting unit 125, and determines whether the first setting unit 125 is in the on state (Step S121 of FIG. 9).

Then, when the relay setting unit 104A determines that the value of the first setting unit 125 is the on value and the first setting unit 125 is in the on state (YES in Step S121 of FIG. 9), the relay setting unit 104A sets the relay mode value 106A to the first mode value indicating the repeater mode (Step S122 of FIG. 9). On the contrary, when the relay setting unit 104A determines that the value of the first setting unit 125 is the off value and the first setting unit 125 is in the off state (NO in Step S121 of FIG. 9), the relay setting unit 104A sets the relay mode value 106A to the second mode value indicating the bridge mode (Step S123 of FIG. 9).

[Step S115 of FIG. 8]

Next, a description is given of the processing of setting the relay mode value 106B by the relay setting unit 104B.

The relay setting unit 104B reads the value of the second setting unit 126, and determines whether the second setting unit 126 is in the on state (Step S121 of FIG. 9).

Then, when the relay setting unit 104B determines that the value of the second setting unit 126 is the on value and the second setting unit 126 is in the on state (YES in Step S121 of FIG. 9), the relay setting unit 104B sets the relay mode value 106B to the first mode value indicating the repeater mode (Step S122 of FIG. 9). On the contrary, when the relay setting unit 104B determines that the value of the second setting unit 126 is the off value and the second setting unit 126 is in the off state (NO in Step S121 of FIG. 9), the relay setting unit 104B sets the relay mode value 106B to the second mode value indicating the bridge mode (Step S123 of FIG. 9).

The processing of setting the relay mode value 106 in Embodiment 1 is not limited to the configuration of the flowchart of FIG. 9. For example, the off state of the first setting unit 125 may be associated with the repeater mode, and when the first setting unit 125 is in the off state, the relay determination unit 103A may set the relay mode value 106A to the repeater mode. Similarly, the off state of the second setting unit 126 may be associated with the repeater mode, and when the second setting unit 126 is in the off state, the relay determination unit 103B may set the relay mode value 106B to the repeater mode. Further, the series of processing steps illustrated in FIG. 9 may be performed only once after the initial processing illustrated in Step S101 of FIG. 8, and at least one of the relay mode value 106A and the relay mode value 106B may be fixed to a static value.

As described above, the communication relay apparatus 100 according to Embodiment 1 switches the operation mode of relay processing depending on the relay mode value 106 set by the relay setting unit 104, and thus frames that are required to be relayed can all be relayed, whereas frames that are not necessarily required to be relayed can be relayed or blocked on the basis of the destination information on communication devices. That is, in the communication relay apparatus 100, for example, the designer of the air-conditioning system 10 can set the states of the first setting unit 125 and the second setting unit 126 depending on details of the configuration of the air-conditioning system 10. Thus, the communication relay apparatus 100 can switch the operation mode of processing of relaying a frame to be input to each communication port depending on the characteristic of a communication device connected to each communication port. Consequently, with the communication relay apparatus 100, it is possible to relay, to a communication device that performs control in synchronization with communication addressed to another component, communication that triggers the control, and to achieve reduction of communication traffic.

A description is given below of an effect obtained by setting the relay mode value 106 in any manner in the exemplary configuration of FIG. 1. In the air-conditioning system 10 of FIG. 1, the outdoor unit 93 and the indoor units 94 to 96, which are connected to the communication port B, perform communication for control, and the central controllers 91 and 92, which are connected to the communication port A, perform communication for operation. Then, the central controllers 91 and 92 use the communication for control performed among the outdoor unit 93 and the indoor units 94 to 96 for synchronized control.

Meanwhile, regarding the air-conditioning system 10 of FIG. 1, in a configuration in which the communication relay apparatus of Patent Literature 2 is introduced instead of the communication relay apparatus 100, when communication traffic is large, communication among the outdoor unit 93 and the indoor units 94 to 96 is not relayed to the central controllers 91 and 92. Consequently, the central controllers 91 and 92 cannot perform synchronized control of, for example, switching display on the display in synchronization with communication among the outdoor unit 93 and the indoor units 94 to 96.

In this respect, the air-conditioning system 10 including the communication relay apparatus 100 sets the relay mode value 106A of the communication port B, to which a communication device configured to perform communication for control is connected, to the first mode value so that communication among the outdoor unit 93 and the indoor units 94 to 96 is all relayed to the central controllers 91 and 92. Thus, the central controllers 91 and 92 can use communication among the outdoor unit 93 and the indoor units 94 to 96 to perform synchronized control. That is, the communication relay apparatus 100 can adjust the value of the first setting unit 125 and the value of the second setting unit 126 to set, to the repeater mode, the operation mode of processing of relaying communication to a communication port that accepts communication delay. Consequently, with the communication relay apparatus 100, it is possible to relay communication that triggers synchronized control to a synchronized communication device.

Further, it is possible to reduce communication traffic of the communication port B, to which a communication device configured to perform communication for control is connected, by setting the relay mode value 106B of the communication port A, to which a communication device configured to perform communication for operation is connected, to the second mode value. That is, the communication relay apparatus 100 can adjust the value of the first setting unit 125 and the value of the second setting unit 126 to set, to the bridge mode, the operation mode of processing of relaying communication to a communication port that does not accept communication delay. Consequently, with the communication relay apparatus 100, communication traffic of a communication port to which a communication device configured to perform communication for control can be reduced, and thus it is possible to reduce communication delay and improve the performance of controlling refrigerant.

In short, in the communication relay apparatus 100, the operation mode of processing of relaying a frame can be set in any manner, and the setting of the operation mode can be switched in any manner. Then, frames that are required to be relayed can all be relayed, whereas frames that are not necessarily required to be relayed can be relayed or blocked on the basis of the destination information on communication devices. Consequently, with the communication relay apparatus 100, it is possible to reduce communication traffic of a communication port to which a communication device for control is connected without hindering synchronized control by a synchronized communication device.

Embodiment 2

Figure 10:
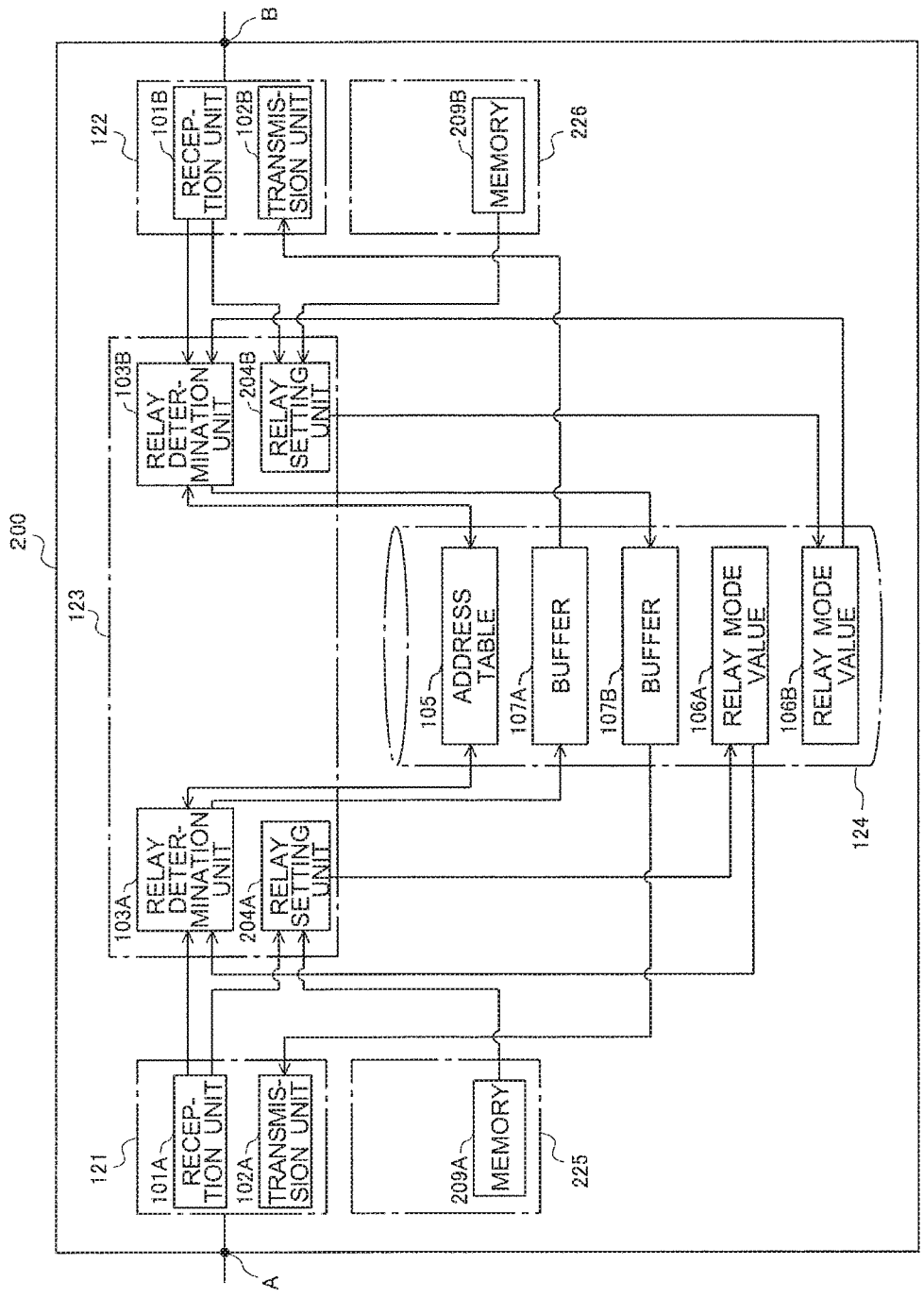
FIG. 10 is a block diagram for illustrating a functional configuration of a communication relay apparatus according to Embodiment 2 of the present invention.

FIG. 10 is a block diagram for illustrating a functional configuration of a communication relay apparatus 200 included in an air-conditioning system according to Embodiment 2 of the present invention. A physical configuration of the communication relay apparatus 200 is similar to the configuration illustrated in FIG. 2. That is, the communication relay apparatus 200 includes a first setting unit 225 and a second setting unit 226 instead of the first setting unit 125 and the second setting unit 126. Further, instead of the relay setting units 104A and 104B, the microcomputer 123 includes relay setting units 204A and 204B having similar functions to those of the relay setting units 104A and 104B.

The communication relay apparatus 100 according to Embodiment 1 described above is configured in such a manner that, for example, the designer of the air-conditioning system sets the value of the first setting unit 125 and the value of the second setting unit 126. However, more flexible relay processing can be performed when the value of the first setting unit 125 and the value of the second setting unit 126 can be set on the basis of information obtained via communication.

In view of the above, the communication relay apparatus 200 according to Embodiment 2 is configured in such a manner that the value of the first setting unit 225 and the value of the second setting unit 226 can be set by using a frame in communication, namely, a frame transmitted to the communication relay apparatus 200 or a frame to be relayed through the communication relay apparatus 200. A specific description is given below of a functional configuration of the communication relay apparatus 200 with reference to FIG. 10. Components equivalent to those in Embodiment 1 are denoted by the same reference signs, and a description of the components is omitted here.

The first setting unit 225 includes a memory 209A. The memory 209A stores the value of the first setting unit 225. The second setting unit 226 includes a memory 209B. The memory 209B stores the value of the second setting unit 226. The value of the first setting unit 225 and the value of the second setting unit 226 each have the on value corresponding to the on state and the off value corresponding to the off state. The relay setting unit 204A sets the value of the first setting unit 225, and the relay setting unit 204B sets the value of the second setting unit 226.

Further, in Embodiment 2, the reception unit 101A has a function of transmitting a frame received via the communication port A to the relay setting unit 204A, and the reception unit 101B has a function of transmitting a frame received via the communication port B to the relay setting unit 204B.

Figure 11:
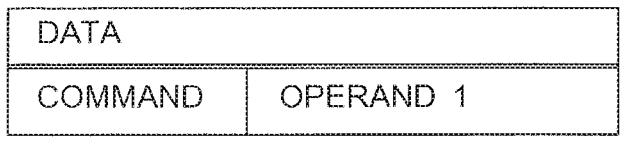
FIG. 11 is an explanatory diagram for illustrating details of data for on-off setting included in a frame received by a reception unit of the communication relay apparatus of FIG. 10.

FIG. 11 is an explanatory diagram for illustrating details of data for on-off setting included in a frame received by the reception unit 101 of the communication relay apparatus 200 of FIG. 10. Data for on-off setting is information indicating an operation mode, and is data corresponding to the value of the first setting unit 225 and the value of the second setting unit 226. As illustrated in FIG. 11, the data for on-off setting includes command information and information on an operand 1.

The data for on-off setting includes "setting unit on" and "setting unit off" as a command type. That is, the data for on-off setting includes information indicating "setting unit on" or "setting unit off" as command information.

The data for on-off setting includes information indicating the set type of a communication port as the information on the operand 1. That is, the data for on-off setting includes, as the information on the operand 1, information indicating the communication port A, information indicating the communication port B, or information indicating both the communication port A and the communication port B, that is, information indicating both the ports.

When the command is "setting unit on," the relay setting unit 204 sets the value of a setting unit corresponding to a communication port set in the operand 1 to the on value. More specifically, when the operand 1 indicates the communication port A, the relay setting unit 204 sets the value of the memory 209A of the first setting unit 225 to the on value, and when the operand 1 indicates the communication port B, the relay setting unit 204 sets the value of the memory 209B of the second setting unit 226 to the on value. Further, when the operand 1 indicates both the ports, the relay setting unit 204 sets the value of the memory 209A of the first setting unit 225 and the value of the memory 209B of the second setting unit 226 to the on value.

When the command is "setting unit off," the relay setting unit 204 sets the value of the setting unit corresponding to the communication port set in the operand 1 to the off value. More specifically, when the operand 1 indicates the communication port A, the relay setting unit 204 sets the value of the first setting unit 225 included in the memory 209A to the off value, and when the operand 1 indicates the communication port B, the relay setting unit 204 sets the value of the second setting unit 226 included in the memory 209B to the off value. Further, when the operand 1 indicates both the ports, the relay setting unit 204 sets the value of the first setting unit 225 and the value of the second setting unit 226 to the off value.

The relay setting unit 204A is configured to receive a reception frame from the reception unit 101A, and identify whether details of data of the reception frame are the data for on-off setting illustrated in FIG. 11. Then, when the details of the data of the reception frame are the data for on-off setting, the relay setting unit 204A sets the value of the first setting unit 225 or the value of the second setting unit 226 in accordance with details of on-off setting.

Further, similarly to the relay setting unit 104A in Embodiment 1, when the value of the first setting unit 225 is the on value, the relay setting unit 204A sets the relay mode value 106A to the first mode value indicating the repeater mode. On the contrary, when the value of the first setting unit 225 is the off value, the relay setting unit 204A sets the relay mode value 106A to the second mode value indicating the bridge mode.

The relay setting unit 204B is configured to receive a reception frame from the reception unit 101B, and identify whether details of the data of the reception frame are the data for on-off setting illustrated in FIG. 11. Then, when the details of the data of the reception frame are the data for on-off setting, the relay setting unit 204B sets the value of the first setting unit 225 or the value of the second setting unit 226 in accordance with details of on-off setting.

Further, similarly to the relay setting unit 104B in Embodiment 1, when the value of the second setting unit 226 is the on value, the relay setting unit 204B sets the relay mode value 106B to the first mode value indicating the repeater mode. On the contrary, when the value of the second setting unit 226 is the off value, the relay setting unit 204B sets the relay mode value 106B to the second mode value indicating the bridge mode.

Figure 12:
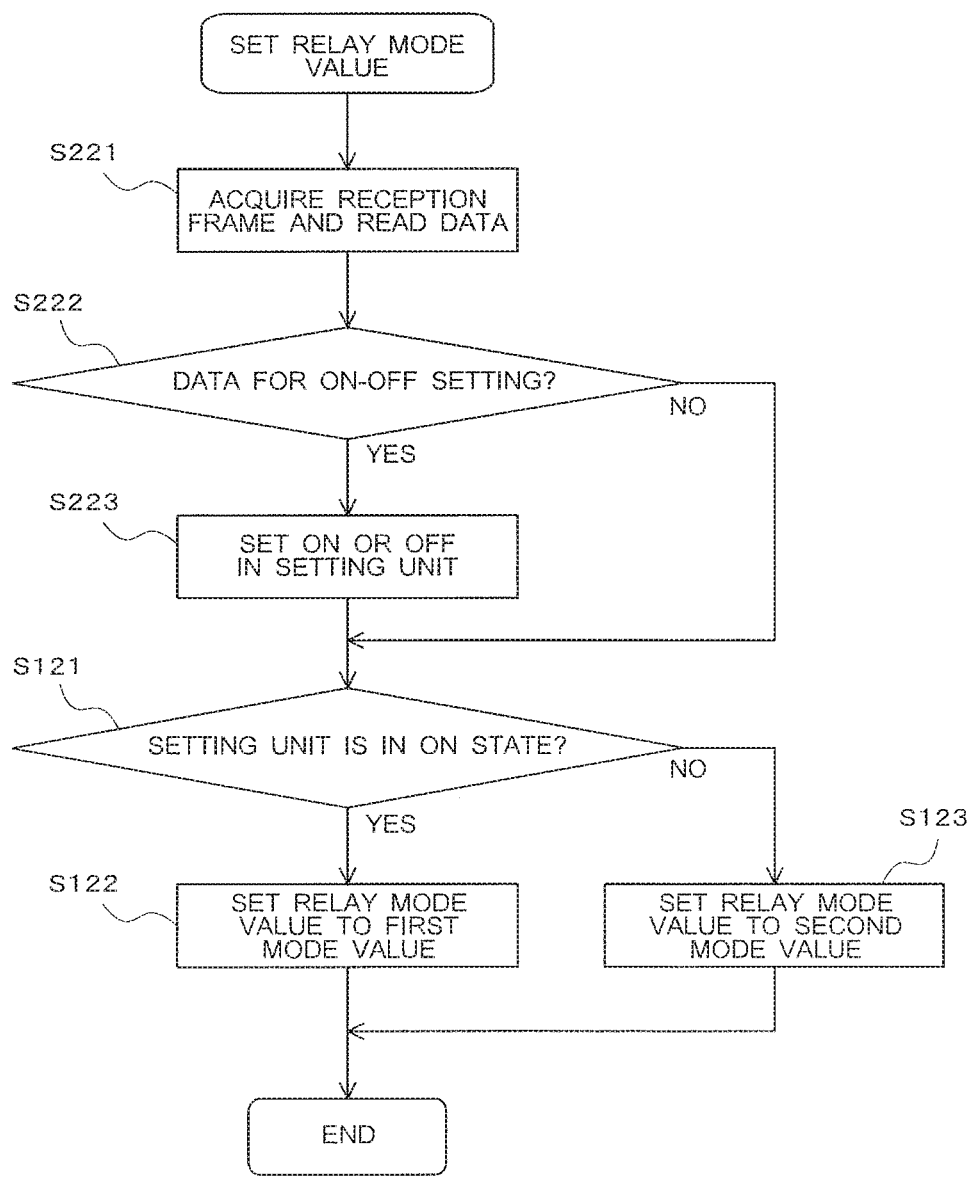
FIG. 12 is flowchart for illustrating an operation of processing of setting a relay mode value by a relay setting unit of FIG. 10.

FIG. 12 is a flowchart for illustrating an operation of processing of setting the relay mode value 106 by the relay setting unit 204 of FIG. 10. The entire operation of the communication relay apparatus 200 is similar to that of the communication relay apparatus 100 illustrated in FIG. 8. Thus, a description is given below of the processing of setting the relay mode value 106 illustrated in Step S108 and Step S115 of FIG. 8 with reference to FIG. 12. The same steps as those of FIG. 9 in Embodiment 1 described above are denoted by the same reference signs, and a description of the steps is omitted here.

[Step S108 of FIG. 8]

First, a description is given of the processing of setting the relay mode value 106A by the relay setting unit 204A.

The relay setting unit 204A acquires a reception frame from the reception unit 101A, and reads the data of the reception frame (Step S221 of FIG. 12). Then, the relay setting unit 204A determines whether the data of the reception frame is the data for on-off setting (Step S222 of FIG. 12). At this time, when the data of the reception frame is the data for on-off setting (YES in Step S222 of FIG. 12), the relay setting unit 204A sets the on value or off value in the first setting unit 225 or the second setting unit 226 in accordance with the details of on-off setting (Step S223 of FIG. 12). On the contrary, when the data of the reception frame is not the data for on-off setting (NO in Step S222 of FIG. 12), the relay setting unit 204A does not perform any processing, and proceeds to Step S121.

Then, similarly to the relay setting unit 104A in FIG. 9, the relay setting unit 204A performs a series of operations illustrated in Step S121 to Step S123 of FIG. 12.

[Step S115 of FIG. 8]

Next, a description is given of the processing of setting the relay mode value 106B by the relay setting unit 204B.

The relay setting unit 204B acquires a reception frame from the reception unit 101B, and reads the data of the reception frame (Step S221 of FIG. 12). Then, the relay setting unit 204B determines whether the data of the reception frame is the data for on-off setting (Step S222 of FIG. 12). At this time, when the data of the reception frame is the data for on-off setting (YES in Step S222 of FIG. 12), the relay setting unit 204B sets the on value or off value in the first setting unit 225 or the second setting unit 226 in accordance with the details of on-off setting (Step S223 of FIG. 12). On the contrary, when the data of the reception frame is not the data for on-off setting (NO in Step S222 of FIG. 12), the relay setting unit 204B does not perform any processing, and proceeds to Step S121.

Then, similarly to the relay setting unit 104B in FIG. 9, the relay setting unit 204B performs the series of operations illustrated in Step S121 to Step S123 of FIG. 12.

In Embodiment 2, a description has been given of an exemplary case in which the relay setting unit 204 sets the on value or the off value in the setting unit, but the configuration is not limited to this example. For example, the relay setting unit 204 may set the on value or the off value in, for example, an internal memory (not shown) of the microcomputer 123.

As described above, the communication relay apparatus 200 switches the operation mode of relay processing depending on the relay mode value 106 set by the relay setting unit 204, and thus frames that are required to be relayed can all be relayed, whereas frames that are not necessarily required to be relayed can be relayed or blocked on the basis of the destination information on communication devices. Consequently, it is possible to relay, to a communication device that performs control in synchronization with communication addressed to another component, communication that triggers the control, and to achieve reduction of communication traffic.

Further, the communication relay apparatus 200 according to Embodiment 2 can set the value of the first setting unit 225 and the value of the second setting unit 226 on the basis of a frame that is transmitted to the communication relay apparatus 200 or a frame to be relayed through the communication relay apparatus 200. That is, the relay setting unit 204 in Embodiment 2 is configured to set the relay mode value 106 on the basis of information indicating the operation mode included in a frame received by the reception unit 101. Thus, when the communication relay apparatus 200 is mounted on the air-conditioning system, all the communication devices connected to the air-conditioning system, for example, a synchronized communication device, transmits a frame so that the value of the first setting unit 225 and the value of the second setting unit 226 are set. That is, the communication relay apparatus 200 can set the relay mode value 106 on the basis of a request from a communication device connected to the air-conditioning system, and thus it is possible to reduce communication traffic by the bridge mode while enabling synchronized control by a communication device that uses communication addressed to another component.

Embodiment 3

Figure 13:
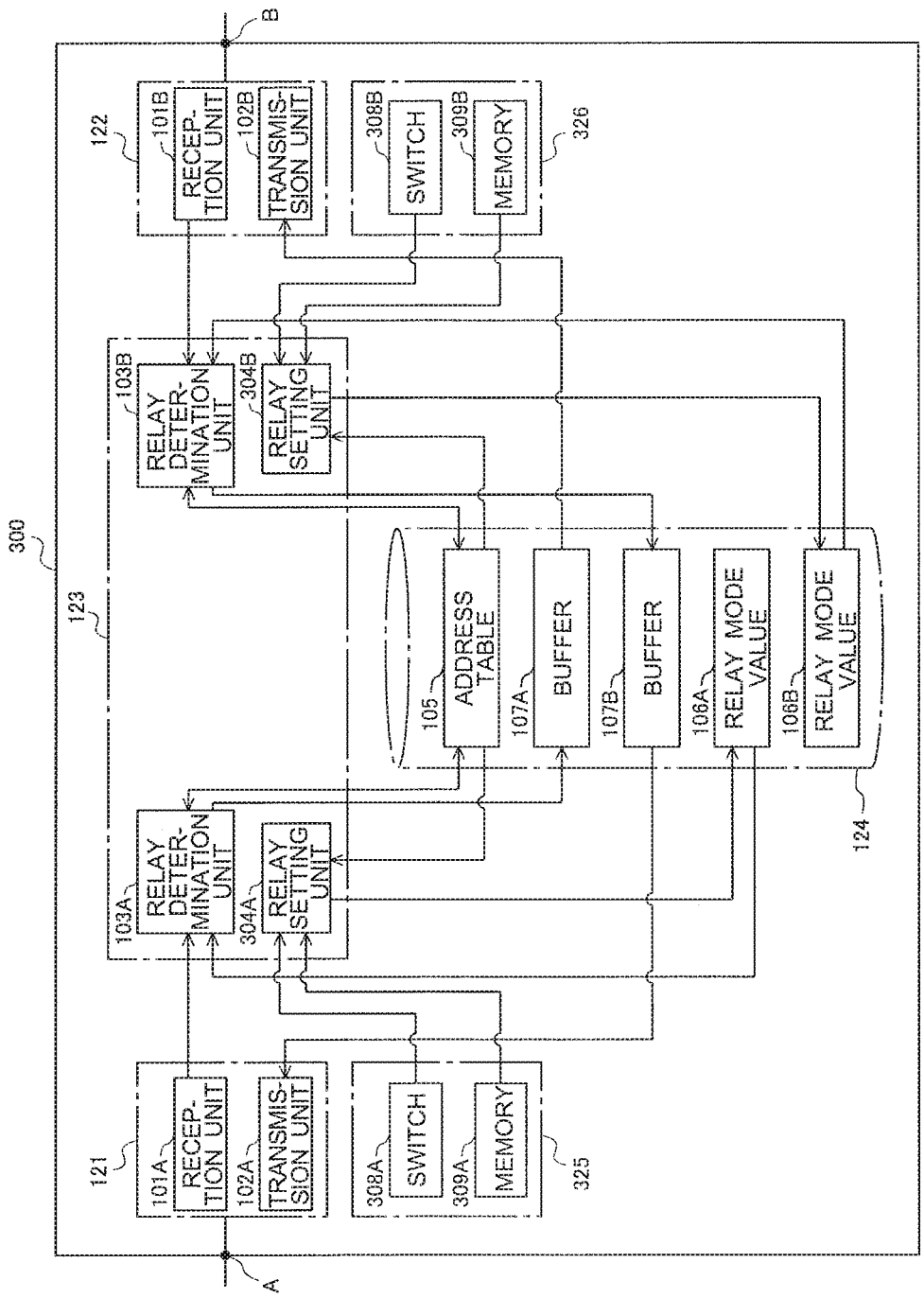
FIG. 13 is a block diagram for illustrating a functional configuration of a communication relay apparatus according to Embodiment 3 of the present invention.

FIG. 13 is a block diagram for illustrating a functional configuration of a communication relay apparatus 300 included in an air-conditioning system according to Embodiment 3 of the present invention. A physical configuration of the communication relay apparatus 300 is similar to the configuration illustrated in FIG. 2. That is, the communication relay apparatus 300 includes a first setting unit 325 and a second setting unit 326 instead of the first setting unit 125 and the second setting unit 126. Further, instead of the relay setting units 104A and 104B, the microcomputer 123 includes relay setting units 304A and 304B having similar functions to those of the relay setting units 104A and 104B.

In Embodiments 1 and 2 described above, the value of the setting unit is required to be set to the on value or the off value. Meanwhile, the air-conditioning system is designed in such a manner that a range of addresses assigned to a communication device configured to perform communication for control and a range of addresses assigned to a communication device configured to perform communication for operation do not overlap. Consequently, it is possible to recognize the specific configuration of a communication system of the air-conditioning system on the basis of the value of an address included in the frame.

Thus, Embodiment 3 is configured in such a manner that the range of addresses assigned to a communication device configured to perform communication for control and the range of addresses assigned to a communication device configured to perform communication for operation are set in the first setting unit 325 and the second setting unit 326 of the communication relay apparatus 300 in advance. A specific description is given below of the functional configuration of the communication relay apparatus 300 with reference to FIG. 13. Components equivalent to those in Embodiments 1 and 2 are denoted by the same reference signs, and a description of the components is omitted here.

The first setting unit 325 includes a switch 308A and a memory 309A. The switch 308A mechanically holds the value of the first setting unit 325. The memory 309A stores the value of the first setting unit 325. The second setting unit 326 includes a switch 308B and a memory 309B. The switch 308B mechanically holds the value of the second setting unit 326. The memory 309B stores the value of the second setting unit 326.

The value of the first setting unit 325 and the value of the second setting unit 326 set in advance indicate the address of a communication device configured to perform communication that triggers synchronized control in the air-conditioning system. For example, a communication device configured to perform communication for control performs communication that triggers synchronized control, and thus a range of addresses that may be assigned to the communication device configured to perform communication for control may be set in advance as the value of the first setting unit 325 and the value of the second setting unit 326. The communication that triggers synchronized control is hereinafter also referred to as "trigger communication," and the communication device configured to perform communication that triggers synchronized control is hereinafter also referred to as a "trigger communication device." Further, the value of the first setting unit 325 is hereinafter also referred to as an "address set in the first setting unit 325," and the value of the second setting unit 326 is hereinafter also referred to as an "address set in the second setting unit 326."

In FIG. 13, as an example, the first setting unit 325 includes both of the switch 308A and the memory 309A, and the second setting unit 326 includes both of the switch 308B and the memory 309B. However, the configuration is not limited to the described configuration. That is, the first setting unit 325 may include at least one of the switch 308A and the memory 309A. Similarly, the second setting unit 326 may include at least one of the switch 308B and the memory 309B.

When the first setting unit 325 includes only the switch 308A, the first setting unit 325 preferably includes the plurality of switches 308A. Then, in the first setting unit 325, the address of the trigger communication device preferably represents as the value of the first setting unit 325 by mechanically combining the on or off states of the plurality of switches 308A. Similarly, when the second setting unit 326 includes only the switch 308B, the second setting unit 326 preferably includes the plurality of switches 308B. Then, in the second setting unit 326, the address of the trigger communication device preferably represents as the value of the second setting unit 326 by mechanically combining the on or off states of the plurality of switches 308B.

Further, when the first setting unit 325 includes only the memory 309A, the first setting unit 325 may be configured in such a manner that the storage area of the memory 309A stores the address of the trigger communication device as the value of the first setting unit 325 at the time of, for example, manufacture of the communication relay apparatus 300. Similarly, when the second setting unit 326 includes only the memory 309B, the second setting unit 326 may be configured in such a manner that the storage area of the memory 309B stores the address of the trigger communication device as the value of the second setting unit 326 at the time of, for example, manufacture of the communication relay apparatus 300.

In this case, the value of the first setting unit 325 and the value of the second setting unit 326 may be set to common values, or different values. That is, the value of the setting unit may be set individually for each communication port. Further, only one or more addresses of the trigger communication devices may be set as the value of the first setting unit 325 or the value of the second setting unit 326. Further, at least one of the first setting unit 325 and the second setting unit 326 may store no set address of the trigger communication device.

The relay setting unit 304A is configured to compare the transmission source address of a frame received from the reception unit 101A with the address set in the first setting unit 325, to thereby identify the trigger communication device and relay communication addressed to a communication port to which a synchronized communication device is connected. Similarly, the relay setting unit 304B is configured to compare the transmission source address of a frame received from the reception unit 101B with the address set in the second setting unit 326, to thereby identify the trigger communication device and relay communication addressed to a communication port to which a synchronized communication device is connected.

In other words, when the address set in the first setting unit 325 is present in the address storage area AT10 of the address table 105 corresponding to the communication port A, the relay setting unit 304A sets the relay mode value 106A to the first mode value indicating the repeater mode. On the contrary, when the address set in the first setting unit 325 is not present in the address storage area AT10 of the address table 105 corresponding to the communication port A, the relay setting unit 304A sets the relay mode value 106A to the second mode value indicating the bridge mode.

Further, when the address set in the second setting unit 326 is present in the address storage area AT10 of the address table 105 corresponding to the communication port B, the relay setting unit 304B sets the relay mode value 106B to the first mode value indicating the repeater mode. On the contrary, when the address set in the second setting unit 326 is not present in the address storage area AT10 of the address table 105 corresponding to the communication port B, the relay setting unit 304B sets the relay mode value 106B to the second mode value indicating the bridge mode.

As described above, the relay setting unit 304 in Embodiment 3 is provided for each of a plurality of communication ports, and each relay setting unit 304 is configured to access information on the address of a trigger communication device that is set in advance. Further, when the information on the address of the trigger communication device is present in the storage area of the address table 105 corresponding to the communication port through which the relay setting unit 304 is connected, the relay setting unit 304 sets the relay mode value 106 to the first mode value.

In FIG. 13, as an example, the communication relay apparatus 300 includes both of the first setting unit 325 and the second setting unit 326. However, the configuration is not limited to this example. The communication relay apparatus 300 may include one setting unit configured to act similarly to the first setting unit 325 and the second setting unit 326 and having a set address of the trigger communication device.

Figure 14:
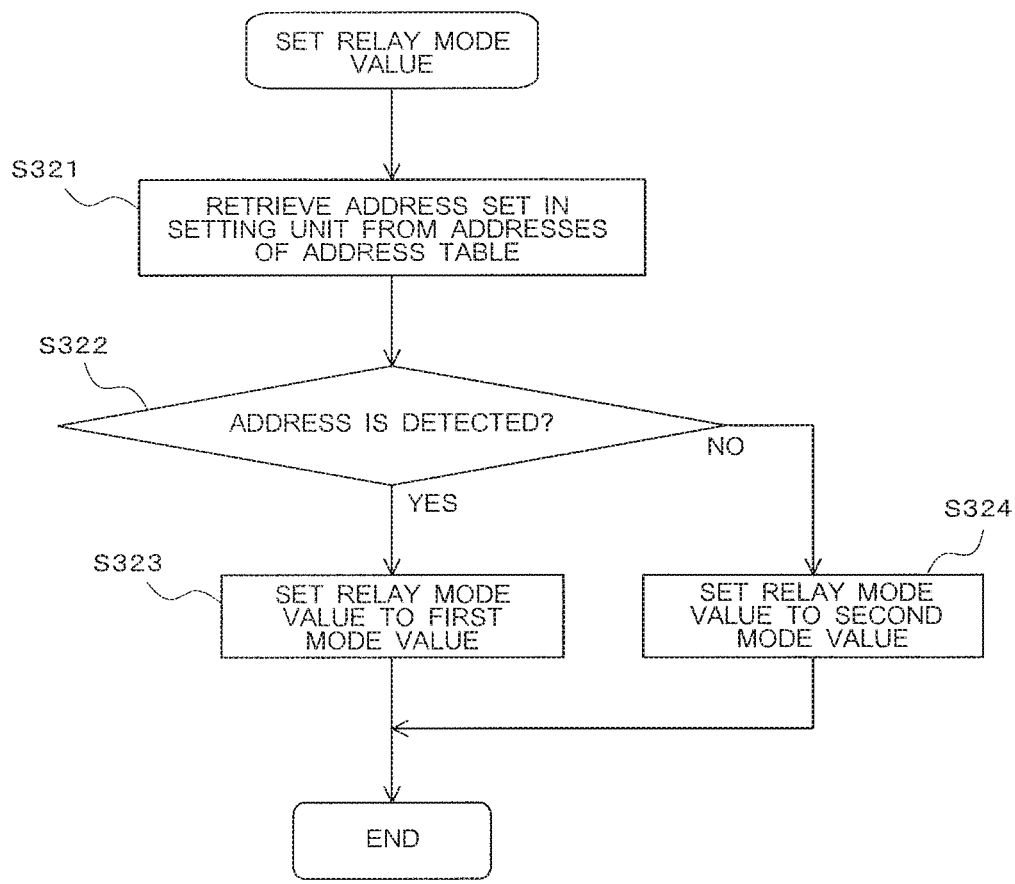
FIG. 14 is a flowchart for illustrating an operation of processing of setting a relay mode value by a relay setting unit of FIG. 13.

FIG. 14 is a flowchart for illustrating an operation of processing of setting the relay mode value 106 by the relay setting unit 304 of FIG. 13. The entire operation of the communication relay apparatus 300 is similar to that of the communication relay apparatus 100 illustrated in FIG. 8. Thus, a description is given below of the processing of setting the relay mode value 106 illustrated in Step S108 and Step S115 of FIG. 8 with reference to FIG. 14.

[Step S108 of FIG. 8]

First, a description is given of the processing of setting the relay mode value 106A by the relay setting unit 304A.

The relay setting unit 304A retrieves an address set in the first setting unit 325 from the address storage area AT10 of the address table 105 corresponding to the communication port A (Step S321 of FIG. 14). At this time, when the address is detected (YES in Step S322 of FIG. 14), the relay setting unit 304A sets the relay mode value 106A to the first mode value indicating the repeater mode (Step S323 of FIG. 14). On the contrary, when the address is not detected (NO in Step S322 of FIG. 14), the relay setting unit 304A sets the relay mode value 106A to the second mode value indicating the bridge mode (Step S324 of FIG. 14).

[Step S115 of FIG. 8]

Next, a description is given of the processing of setting the relay mode value 106B by the relay setting unit 304B.

The relay setting unit 304B retrieves an address set in the second setting unit 326 from the address storage area AT10 of the address table 105 corresponding to the communication port B (Step S321 of FIG. 14). At this time, when the address is detected (YES in Step S322 of FIG. 14), the relay setting unit 304B sets the relay mode value 106B to the first mode value indicating the repeater mode (Step S323 of FIG. 14). On the contrary, when the address is not detected (NO in Step S322 of FIG. 14), the relay setting unit 304B sets the relay mode value 106B to the second mode value indicating the bridge mode (Step S324 of FIG. 14).

As described above, the communication relay apparatus 300 switches the operation mode of relay processing depending on the relay mode value 106 set by the relay setting unit 304, and thus frames that are required to be relayed can all be relayed, whereas frames that are not necessarily required to be relayed can be relayed or blocked on the basis of the destination information on communication devices. Consequently, it is possible to relay, to a communication device that performs control in synchronization with communication addressed to another component, communication that triggers the control, and to achieve reduction of communication traffic.

Further, the communication relay apparatus 300 according to Embodiment 3 can identify a communication port to which the trigger communication device is connected on the basis of the given value of the setting unit, and thus can relay all the communication that triggers synchronized control. Further, the communication relay apparatus 300 relays or blocks communication to a communication port other than the communication port to which the trigger communication device is connected on the basis of the destination information on communication devices connected to the communication port other than the communication port to which the trigger communication device is connected.

In other words, the communication relay apparatus 300 determines whether a transmitted frame is a frame transmitted from the trigger communication device on the basis of the given value of the setting unit, and performs the processing of relaying the frame depending on the result of determination. Thus, with the communication relay apparatus 300, it is possible to reduce communication traffic by the bridge mode while maintaining the environment in which a communication device that uses communication addressed to another component can perform synchronized control. Further, in the communication relay apparatus 100 according to Embodiment 1, the relay setting unit 104 sets the relay mode value 106 on the basis of the value of the setting unit set by, for example, the designer of the air-conditioning system. In this respect, in the communication relay apparatus 300 according to Embodiment 3, the relay setting unit 304 sets the relay mode value 106 on the basis of the common value of the setting unit given in advance, and thus it is possible to save the labor of, for example, the designer of the air-conditioning system. The characteristic details of the configuration of Embodiment 3 can be incorporated into the details of the configuration of Embodiment 1 or 2 described above.

Embodiment 4

Figure 15:
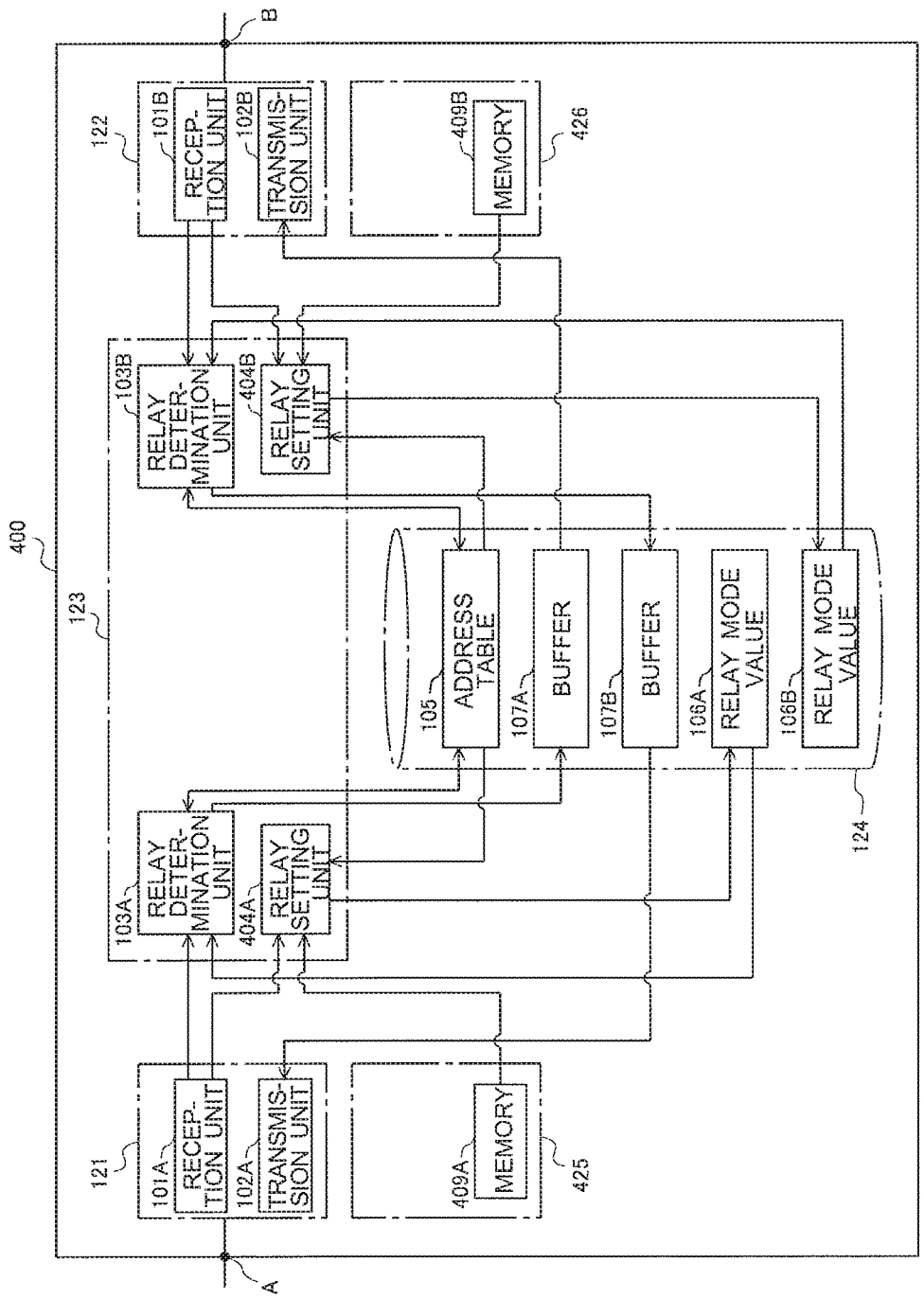
FIG. 15 is a block diagram for illustrating a functional configuration of a communication relay apparatus according to Embodiment 4 of the present invention.

FIG. 15 is a block diagram for illustrating a functional configuration of a communication relay apparatus 400 included in an air-conditioning system according to Embodiment 4 of the present invention. A physical configuration of the communication relay apparatus 400 is similar to the configuration illustrated in FIG. 2. That is, the communication relay apparatus 400 includes a first setting unit 425 and a second setting unit 426 instead of the first setting unit 125 and the second setting unit 126. Further, instead of the relay setting units 104A and 104B, the microcomputer 123 includes relay setting units 404A and 404B having similar functions to those of the relay setting units 104A and 104B.

The communication relay apparatus 300 according to Embodiment 3 described above sets the values of the first setting unit 325 and the second setting unit 326 by using addresses given in advance. However, when the address of a trigger communication device dynamically changes depending on the system configuration, the synchronized communication device may not be able to perform synchronized control.

In view of the above, the communication relay apparatus 400 according to Embodiment 4 is configured to set the address of a trigger communication device in the first setting unit 425 and the second setting unit 426 by using a communication frame. A specific description is given below of the functional configuration of the communication relay apparatus 400 with reference to FIG. 15. Components equivalent to those in Embodiments 1 to 3 are denoted by the same reference signs, and a description of the components is omitted here.

The first setting unit 425 includes a memory 409A. The memory 409A stores the address of a trigger communication device as the value of the first setting unit 425. The relay setting unit 404A sets the value of the first setting unit 425.

The second setting unit 426 includes a memory 409B. The memory 409B stores the address of a trigger communication device as the value of the second setting unit 426. The relay setting unit 404B sets the value of the second setting unit 426.

Figures 16, 17:
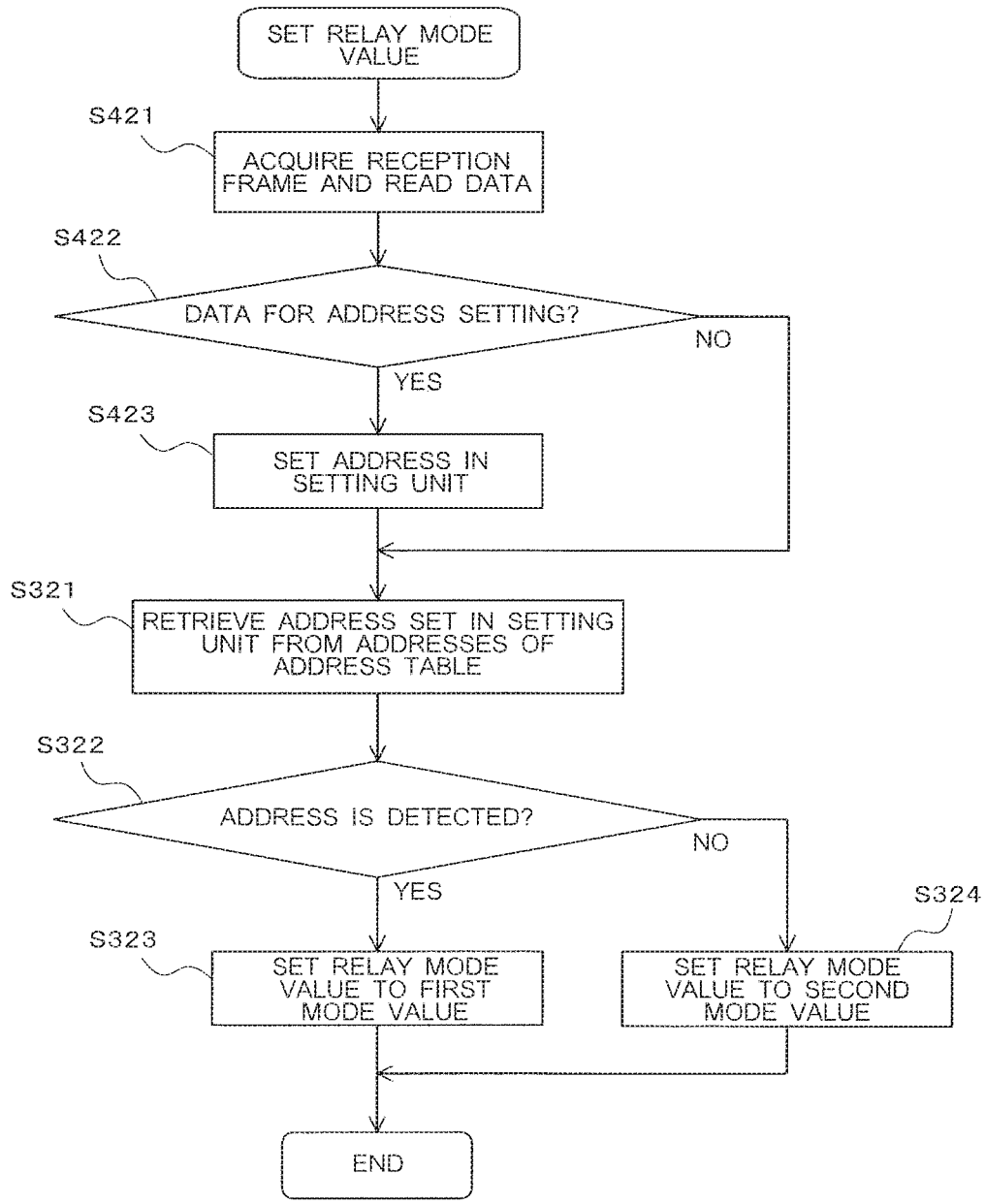
FIG. 16 is an explanatory diagram for illustrating details of data for address setting included in a frame received by a reception unit of the communication relay apparatus of FIG. 15.
FIG. 17 is a flowchart for illustrating an operation of processing of setting a relay mode value by a relay setting unit of FIG. 15.

FIG. 16 is an explanatory diagram for illustrating details of data for address setting included in a frame received by the reception unit 101 of the communication relay apparatus 400 of FIG. 15. The data for address setting is data corresponding to the value of the first setting unit 425 and the value of the second setting unit 426. As illustrated in FIG. 16, the data for address setting includes command information, information on an operand 1, and information on an operand 2.

The data for address setting includes "add address" and "delete address" as a command type. That is, the data for address setting includes information indicating "add address" or "delete address" as command information. The data for address setting includes, as the information of the operand 1, information meaning the communication port A, information meaning the communication port B, or information meaning both the ports. The data for address setting includes the value of an address as the information of the operand 2.

When the command for address setting is "add address," the relay setting unit 404 adds the value of an address set in the operand 2 to a communication port set in the operand 1. More specifically, when the operand 1 is the communication port A, the relay setting unit 404 adds the value of an address set in the operand 2 to the memory 409A of the first setting unit 425, and when the operand 1 is the communication port B, the relay setting unit 404 adds the value of an address set in the operand 2 to the memory 409B of the second setting unit 426. Further, when the operand 1 indicates both the ports, the relay setting unit 404 adds the value of an address set in the operand 2 to the memory 409A of the first setting unit 425 and the memory 409B of the second setting unit 426.

When the command for address setting is "delete address," the relay setting unit 404 deletes the value of the address set in the operand 2 from the communication port set in the operand 1. More specifically, when the operand 1 is the communication port A, the relay setting unit 404 deletes the value of the address set in the operand 2 from the memory 409A of the first setting unit 425, and when the operand 1 is the communication port B, the relay setting unit 404 deletes the value of the address set in the operand 2 from the memory 409B of the second setting unit 426. Further, when the operand 1 indicates both the ports, the relay setting unit 404 deletes the value of the address set in the operand 2 from the memory 409A of the first setting unit 425 and the memory 409B of the second setting unit 426.

The relay setting unit 404A is configured to receive a reception frame from the reception unit 101A, and identify whether the details of the data of the reception frame are the data for address setting illustrated in FIG. 16. Further, the relay setting unit 404A is configured to set the value of the first setting unit 425 or the value of the second setting unit 426 depending on the details of address setting when the details of the data of the reception frame are the data for address setting.

Similarly to the relay setting unit 304A in Embodiment 3, the relay setting unit 404A is configured to set the relay mode value 106A. That is, when the address set in the first setting unit 425 is present in the address storage area AT10 of the address table 105 corresponding to the communication port A, the relay setting unit 404A sets the relay mode value 106A to the first mode value. On the contrary, when the address set in the first setting unit 425 is not present in the address storage area AT10 of the address table corresponding to the communication port A, the relay setting unit 404A sets the relay mode value 106A to the second mode value.

The relay setting unit 404B is configured to receive a reception frame from the reception unit 101B, and identify whether the details of the data of the reception frame are the data for address setting illustrated in FIG. 16. Further, the relay setting unit 404B is configured to set the value of the first setting unit 425 or the value of the second setting unit 426 depending on the details of address setting when the details of the data of the reception frame are the data for address setting.

Further, similarly to the relay setting unit 304B in Embodiment 3, the relay setting unit 404B is configured to set the relay mode value 106B. That is, when the address set in the second setting unit 426 is present in the address storage area AT10 of the address table 105 corresponding to the communication port B, the relay setting unit 404B sets the relay mode value 106B to the first mode value. Further, when the address set in the second setting unit 426 is not present in the address storage area AT10 of the address table corresponding to the communication port A, the relay setting unit 404B sets the relay mode value 106B to the second mode value.

As described above, the relay setting unit 404 according to Embodiment 4 is provided for each of a plurality of communication ports, and each relay setting unit 404 has a function of acquiring information on the address of a trigger communication device from a frame received by the reception unit 101. Further, when the information on the address of the trigger communication device is present in the storage area of the address table 105 corresponding to the communication port through which the relay setting unit 404 is connected, the relay setting unit 404 sets the relay mode value 106 to the first mode value.

FIG. 17 is a flowchart for illustrating an operation of processing of setting the relay mode value 106 by the relay setting unit 404 of FIG. 15. The entire operation of the communication relay apparatus 400 is similar to that of the communication relay apparatus 100 illustrated in FIG. 8. Thus, a description is given below of the processing of setting the relay mode value 106 illustrated in Step S108 and Step S115 of FIG. 8 with reference to FIG. 17. The same steps as those of FIG. 14 in Embodiment 3 described above are denoted by the same reference signs, and a description of the steps is omitted here.

[Step S108 of FIG. 8]

First, a description is given of the processing of setting the relay mode value 106A by the relay setting unit 404A.

The relay setting unit 404A acquires a reception frame from the reception unit 101A, and reads the data of the reception frame (Step S421 of FIG. 17). Then, the relay setting unit 404A checks whether the details of the data of the reception frame are a command for address setting (Step S422 of FIG. 17). At this time, when the data of the reception frame is a command for address setting (YES in Step S422 of FIG. 17), the relay setting unit 404A adds or deletes an address to or from the first setting unit 425 or the second setting unit 426 depending on the details of address setting (Step S423 of FIG. 17). On the contrary, when the data of the reception frame is not a command for address setting (NO in Step S422 of FIG. 17), the relay setting unit 404A does not perform any processing, and proceeds to Step S321. Then, similarly to the relay setting unit 304A in FIG. 14, the relay setting unit 404A performs a series of operations illustrated in Step S321 to Step S324 of FIG. 17.

[Step S115 of FIG. 8]

Next, a description is given of the processing of setting the relay mode value 106B by the relay setting unit 404B.

The relay setting unit 404B acquires a reception frame from the reception unit 101B, and reads the data of the reception frame (Step S421 of FIG. 17). Then, the relay setting unit 404B checks whether the details of the data of the reception frame are a command for address setting (Step S422 of FIG. 17). At this time, when the data of the reception frame is a command for address setting (YES in Step S422 of FIG. 17), the relay setting unit 404B adds or deletes an address to or from the first setting unit 425 or the second setting unit 426 depending on the details of address setting (Step S423 of FIG. 17). On the contrary, when the data of the reception frame is not a command for address setting (NO in Step S422 of FIG. 17), the relay setting unit 404B does not perform any processing, and proceeds to Step S321. Then, similarly to the relay setting unit 304B in FIG. 14, the relay setting unit 404B performs the series of operations illustrated in Step S321 to Step S324 of FIG. 17.

As described above, the communication relay apparatus 400 switches the operation mode of relay processing depending on the relay mode value 106 set by the relay setting unit 404, and thus frames that are required to be relayed can all be relayed, whereas frames that are not necessarily required to be relayed can be relayed or blocked on the basis of the destination information on communication devices. Consequently, it is possible to relay, to a communication device that performs control in synchronization with communication addressed to another component, communication that triggers the control, and to achieve reduction of communication traffic.

Further, the communication relay apparatus 400 according to Embodiment 4 can set the address of a trigger communication device as the value of the setting unit by using a frame transmitted to the communication relay apparatus 400 or a frame to be relayed through the communication relay apparatus 400. Thus, with the communication relay apparatus 400, even when the address of a trigger communication device changes due to the change in air-conditioning system, all the communication devices connected to the air-conditioning system can set the first setting unit 425 and the second setting unit 426 through transmission of a frame. Consequently, the communication relay apparatus 400 can perform setting in such a manner that all the communication from a trigger communication device is relayed also when the address of the trigger communication device is newly set by, for example, an operator as in Patent Literature 1. The characteristic details of the configuration of Embodiment 4 can be incorporated into the details of the configuration of Embodiments 1 to 3 described above.

Embodiment 5

Figure 18:
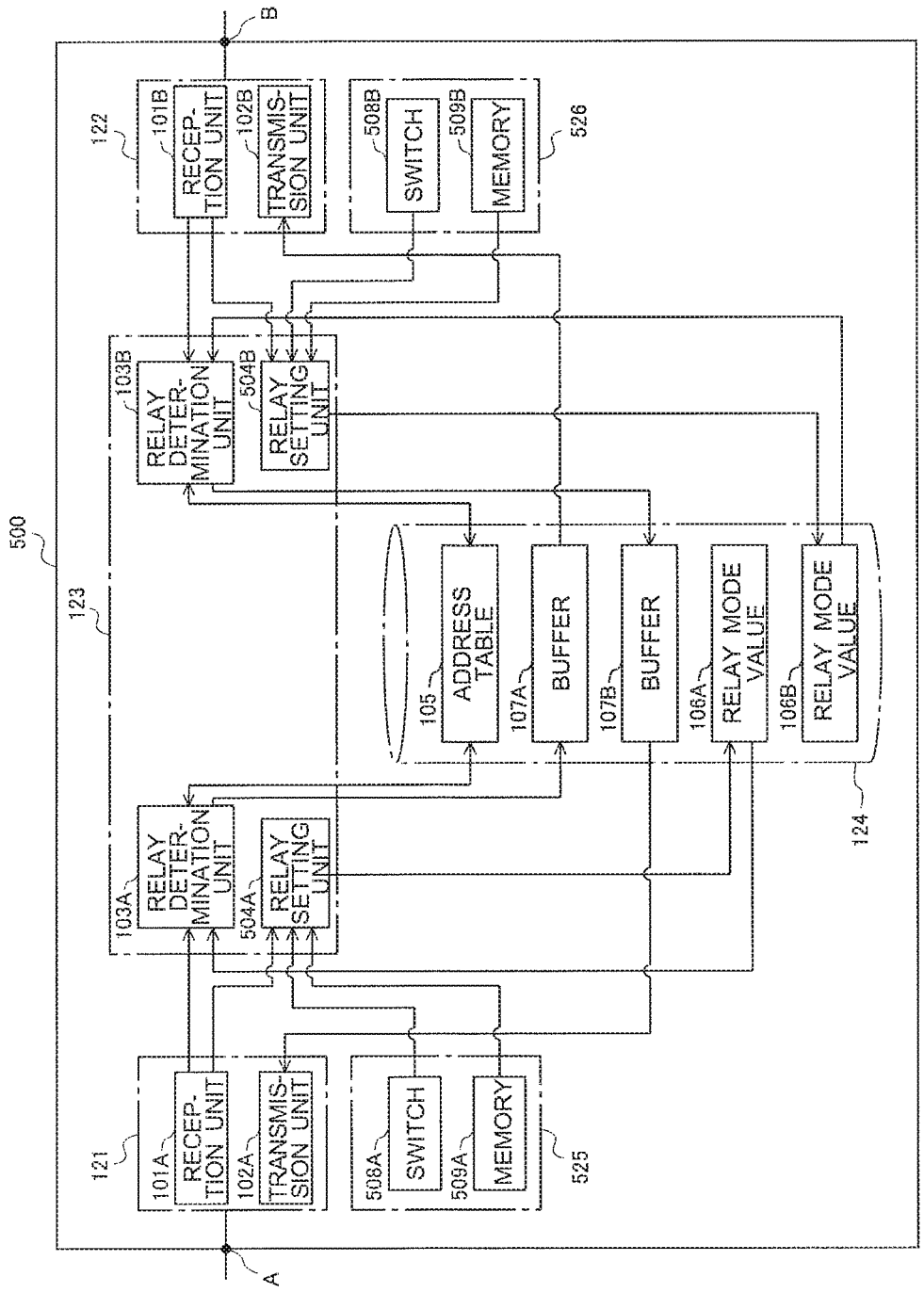
FIG. 18 is a block diagram for illustrating a functional configuration of a communication relay apparatus according to Embodiment 5 of the present invention.

FIG. 18 is a block diagram for illustrating a functional configuration of a communication relay apparatus 500 included in an air-conditioning system according to Embodiment 5 of the present invention. A physical configuration of the communication relay apparatus 500 is similar to the configuration illustrated in FIG. 2. That is, the communication relay apparatus 500 includes a first setting unit 525 and a second setting unit 526 instead of the first setting unit 125 and the second setting unit 126. Further, instead of the relay setting units 104A and 104B, the microcomputer 123 includes relay setting units 504A and 504B having similar functions to those of the relay setting units 104A and 104B.

In Embodiments 1 to 4 described above, there is exemplified a configuration of setting the operation mode relating to the processing of relaying communication for each communication port. However, a combination of a trigger communication device and a communication device that does not perform trigger communication may be connected to one communication port, and communication of the communication device that does not perform trigger communication is not necessarily required to be relayed in the first place. That is, in the configurations of Embodiment 1 to 4, in a case where a trigger communication device and a communication device that does not perform trigger communication are connected to one communication port, even a frame transmitted by the communication device that does not perform trigger communication is always transmitted when a communication port to which the communication device is connected is set to the repeater mode.

In view of the above, the communication relay apparatus 500 according to Embodiment 5 is configured in such a manner that, every time the reception unit 101 receives a frame, the relay setting unit 504 receives the frame from the reception unit 101. Then, the relay setting unit 504 identifies SA, which is a self address included in the frame received from the reception unit 101, determines whether SA is an address of the trigger communication device, and performs the processing of setting the relay mode value 106 on the basis of the result of determination. A specific description is given below of the functional configuration of the communication relay apparatus 500 with reference to FIG. 18. Components equivalent to those in Embodiments 1 to 4 are denoted by the same reference signs, and a description of the components is omitted here.

The first setting unit 525 includes a switch 508A and a memory 509A. The switch 508A mechanically holds the value of the first setting unit 525. The memory 509A stores the value of the first setting unit 525.

The switch 508A may set the value of the first setting unit 525 in any manner as in Embodiment 1, or the address of a trigger communication device may be set in advance as the value of the first setting unit 525 as in Embodiment 3. Further, the value of the first setting unit 525 may be set in the memory 509A by the relay setting unit 504A. That is, the relay setting unit 504A is configured to set the address of a trigger communication device in the storage area of the memory 509A as the value of the first setting unit 525.

The second setting unit 526 includes a switch 508B and a memory 509B. The switch 508B mechanically holds the value of the second setting unit 526. The memory 509B stores the value of the second setting unit 526.

The switch 508B may set the value of the second setting unit 526 in any manner as in Embodiment 1, or the address of a trigger communication device may be set in advance as the value of the second setting unit 526 as in Embodiment 3. Further, the value of the second setting unit 526 may be set in the memory 509B by the relay setting unit 504B. That is, the relay setting unit 504B is configured to set the address of a trigger communication device in the storage area of the memory 509B as the value of the second setting unit 526.

The first setting unit 525 is only required to include at least the memory 509A among the switch 508A and the memory 509A, and the second setting unit 526 is only required to include at least the memory 509B among the switch 508B and the memory 509B. The specific configurations of the first setting unit 525 and the second setting unit 526 are similar to those of the first setting unit 325 and the second setting unit 326 in Embodiment 3 described above.

Further, the value of the first setting unit 525 and the value of the second setting unit 526 may be set to common values, or different values. That is, the value of the setting unit may be set individually for each communication port. Further, only one or more of addresses of the trigger communication devices may be set as the value of the first setting unit 525 or the value of the second setting unit 526. Further, at least one of the first setting unit 525 and the second setting unit 526 may store no set address of the trigger communication device.

Similarly to the relay setting unit 404A in Embodiment 4, the relay setting unit 504A identifies whether the details of the data of a reception frame received from the reception unit 101A is the data for address setting illustrated in FIG. 16. Then, when the data of the reception frame is the data for address setting, the relay setting unit 504A sets the value of the first setting unit 525 or the value of the second setting unit 526 depending on the details of address setting.

Further, the relay setting unit 504A is configured to identify SA of a reception frame, and set the relay mode value 106A to the first mode value indicating the repeater mode when SA of the reception frame matches the address set in the first setting unit 525. Further, the relay setting unit 504A is configured to set the relay mode value 106A to the second mode value indicating the bridge mode when SA of the reception frame does not match the address set in the first setting unit 125.

Similarly to the relay setting unit 404B in Embodiment 4, the relay setting unit 504B identifies whether the details of the data of a reception frame received from the reception unit 101B is the data for address setting illustrated in FIG. 16. Then, when the data of the reception frame is the data for address setting, the relay setting unit 504B sets the value of the first setting unit 525 or the value of the second setting unit 526 depending on the details of address setting.

Further, the relay setting unit 504B is configured to identify SA of a reception frame, and set the relay mode value 106B to the first mode value indicating the repeater mode when SA of the reception frame matches the address set in the second setting unit 526. Further, the relay setting unit 504B is configured to set the relay mode value 106B to the second mode value indicating the bridge mode when SA of the reception frame does not match the address set in the first setting unit 125.

As described above, the relay setting unit 504 in Embodiment 5 has a function of acquiring information on the address of a trigger communication device from a frame received by the reception unit 101. Further, the relay setting unit 504 is configured to acquire, from the frame received by the reception unit 101, the address of a communication device that is the transmission source of the frame as transmission source address information, and set the relay mode value 106 to the first mode value when the acquired transmission source address information is contained in the information on the address of the trigger communication devices.

Figure 19:
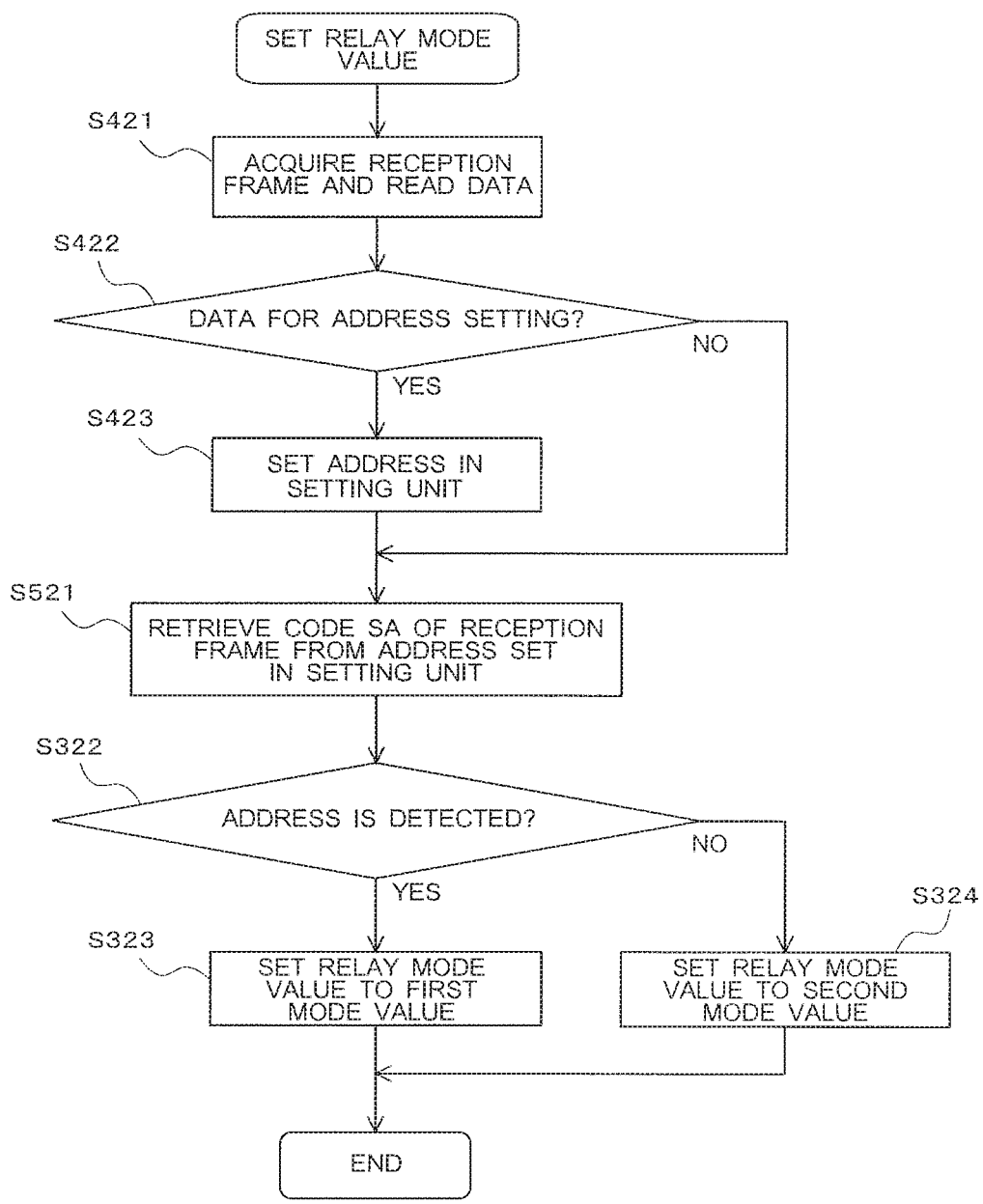
FIG. 19 is a flowchart for illustrating an operation of processing of setting a relay mode value by a relay setting unit of FIG. 18.

FIG. 19 is a flowchart for illustrating an operation of processing of setting the relay mode value 106 by the relay setting unit 504 of FIG. 18. The entire operation of the communication relay apparatus 500 is similar to that of the communication relay apparatus 100 illustrated in FIG. 8. Thus, a description is given below of the processing of setting the relay mode value 106 illustrated in Step S108 and Step S115 of FIG. 8 with reference to FIG. 19. The same steps as those of FIG. 17 in Embodiment 4 described above are denoted by the same reference signs, and a description of the steps is omitted here.

[Step S108 of FIG. 8]

First, a description is given of the processing of setting the relay mode value 106A by the relay setting unit 504A.

Similarly to the relay setting unit 404A in FIG. 17, the relay setting unit 504A performs a series of operations illustrated in Step S421 to Step S423 of FIG. 17. That is, the relay setting unit 504A acquires a reception frame from the reception unit 101A, and sets the address of the first setting unit 525 on the basis of the data of the reception frame.

Further, the relay setting unit 504A retrieves SA of the reception frame from addresses set in the first setting unit 525 (Step S521 of FIG. 19). At this time, when an address indicated by SA of the reception frame is detected (YES in Step S322 of FIG. 19), the relay setting unit 504A sets the relay mode value 106A to the first mode value (Step S323 of FIG. 19). On the contrary, when an address indicated by SA of the reception frame is not detected (NO in Step S322 of FIG. 19), the relay setting unit 504A sets the relay mode value 106A to the second mode value (Step S324 of FIG. 19).

The relay setting unit 504A performs the above-mentioned series of processing steps for each frame.

[Step S115 of FIG. 8]

Next, a description is given of the processing of setting the relay mode value 106B by the relay setting unit 504B.

Similarly to the relay setting unit 404B in FIG. 17, the relay setting unit 504B performs the series of operations illustrated in Step S421 to Step S423 of FIG. 17. That is, the relay setting unit 504B acquires a reception frame from the reception unit 101B, and sets the address of the second setting unit 526 on the basis of the data of the reception frame.

Further, the relay setting unit 504B retrieves SA of the reception frame from addresses set in the second setting unit 526 (Step S521 of FIG. 19). At this time, when an address indicated by SA of the reception frame is detected (YES in Step S322 of FIG. 19), the relay setting unit 504B sets the relay mode value 106B to the first mode value (Step S323 of FIG. 19). On the contrary, when an address indicated by SA of the reception frame is not detected (NO in Step S322 of FIG. 19), the relay setting unit 504B sets the relay mode value 106B to the second mode value (Step S324 of FIG. 19).

The relay setting unit 504B performs the above-mentioned series of processing steps for each frame.

As described above, the communication relay apparatus 500 switches the operation mode of relay processing depending on the relay mode value 106 set by the relay setting unit 504, and thus frames that are required to be relayed can all be relayed, whereas frames that are not necessarily required to be relayed can be relayed or blocked on the basis of the destination information on communication devices. Consequently, it is possible to relay, to a communication device that performs control in synchronization with communication addressed to another component, communication that triggers the control, and to achieve reduction of communication traffic.

Further, the communication relay apparatus 500 according to Embodiment 5 identifies SA for each reception frame, and compares SA with the addresses set in the first setting unit 525 or the second setting unit 526. Then, when the reception frame is a frame transmitted by the trigger communication device, the communication relay apparatus 500 sets the operation mode to the repeater mode to relay communication, and, when the reception frame is not a frame transmitted by the trigger communication device, the communication relay apparatus 500 sets the operation mode to the bridge mode to relay or block communication on the basis of the destination information on communication devices. That is, the communication relay apparatus 500 can relay only the communication of the trigger communication device, and thus it is possible to reduce communication traffic more without hindering synchronized control by the synchronized communication device.

In Embodiment 5, a description has been given of an exemplary case in which the relay setting unit 504 has a function of acquiring information on the address of a trigger communication device from the frame received by the reception unit 101, but the configuration is not limited to this example. For example, the relay setting unit 504 may be configured to access information on the address of a trigger communication device that is set in advance through setting from the outside. In this case, the relay setting unit 504 may not have a function of acquiring information on the address of a trigger communication device from the frame. The characteristic details of the configuration of Embodiment 5 can be incorporated into the details of the configuration of Embodiments 1 to 4 described above.

Embodiment 6

Figure 20:
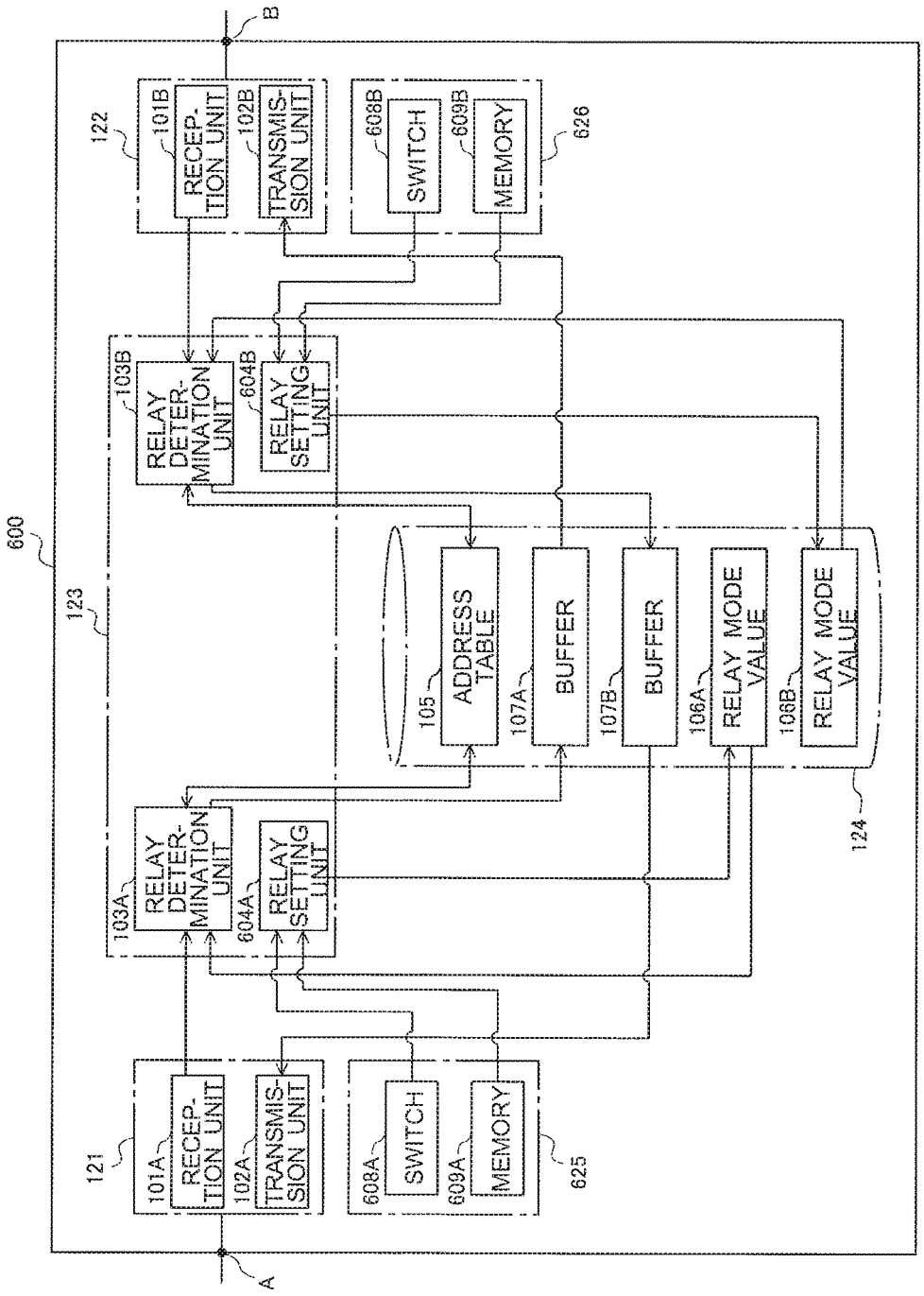
FIG. 20 is a block diagram for illustrating a functional configuration of a communication relay apparatus according to Embodiment 6 of the present invention.

FIG. 20 is a block diagram for illustrating a functional configuration of a communication relay apparatus 600 included in an air-conditioning system according to Embodiment 6 of the present invention. A physical configuration of the communication relay apparatus 600 is similar to the configuration illustrated in FIG. 2. That is, the communication relay apparatus 600 includes a first setting unit 625 and a second setting unit 626 instead of the first setting unit 125 and the second setting unit 126. Further, instead of the relay setting units 104A and 104B, the microcomputer 123 includes relay setting units 604A and 604B having similar functions to those of the relay setting units 104A and 104B.

In Embodiment 5 described above, the relay mode is set through the address of a trigger communication device, but the trigger communication device does not necessarily perform communication that triggers synchronized control. That is, the trigger communication device may transmit a frame that does not include details of communication that triggers synchronized control.

In view of the above, the communication relay apparatus 600 according to Embodiment 6 is configured to identify details of communication that triggers synchronized control, that is, identify trigger communication information indicating the type of communication that triggers synchronized control, to thereby relay only the communication that triggers synchronized control. A specific description is given below of the functional configuration of the communication relay apparatus 600 with reference to FIG. 20. Components equivalent to those in Embodiments 1 to 5 are denoted by the same reference signs, and a description of the components is omitted here.

The first setting unit 625 includes a switch 608A and a memory 609A. The switch 608A mechanically holds the value of the first setting unit 625. The memory 609A stores the value of the first setting unit 625. The second setting unit 626 includes a switch 608B and a memory 609B. The switch 608B mechanically holds the value of the second setting unit 626. The memory 609B stores the value of the second setting unit 626. The value of the first setting unit 625 and the value of the second setting unit 626 are set to indicate data for communication that triggers synchronized control, that is, data for trigger communication.

The first setting unit 625 may include at least one of the switch 608A and the memory 609A, and the second setting unit 626 may include at least one of the switch 608B and the memory 609B. The specific configurations of the first setting unit 625 and the second setting unit 626 are similar to those of the first setting unit 325 and the second setting unit 326 in Embodiment 3 described above. That is, the first setting unit 625 and the second setting unit 626 can be configured mechanically, or configured by a memory.

Further, the value of the first setting unit 625 and the value of the second setting unit 626 may be set to common values, or different values. That is, the value of the setting unit may be set individually for each communication port. Further, only one or more of addresses of the trigger communication devices may be set as the value of the first setting unit 625 or the value of the second setting unit 626. Further, at least one of the first setting unit 625 and the second setting unit 626 may store no set address of the trigger communication device.

The relay setting unit 604A is configured to acquire a reception frame from the reception unit 101A, and identify whether details of the data of the reception frame, namely, type information indicating the type of communication of the reception frame is data set in the first setting unit 625 as trigger communication information. Then, when the data of the reception frame is data set in the first setting unit 625, the relay setting unit 604A sets the relay mode value 106A to the first mode value indicating the repeater mode. Further, when the data of the reception frame is not data set in the first setting unit 625, the relay setting unit 604A sets the relay mode value 106A to the second mode value indicating the bridge mode.

The relay setting unit 604B is configured to acquire a reception frame from the reception unit 101B, and identify whether details of the data of the reception frame, namely, type information indicating the type of communication of the reception frame is data set in the second setting unit 626 as trigger communication information. Then, when the data of the reception frame is data set in the second setting unit 626, the relay setting unit 604B sets the relay mode value 106B to the first mode value indicating the repeater mode. Further, when the data of the reception frame is not data set in the second setting unit 626, the relay setting unit 604B sets the relay mode value 106B to the second mode value indicating the bridge mode.

As described above, the relay setting unit 604 in Embodiment 6 is configured to access trigger communication information set in advance and indicating the type of communication that triggers synchronized control. Then, the relay setting unit 604 reads, from a frame received by the reception unit 101, the type information indicating the type of communication of the frame, and sets the relay mode value 106 to the first mode value when the read type information is contained in the trigger communication information.

Figure 21:
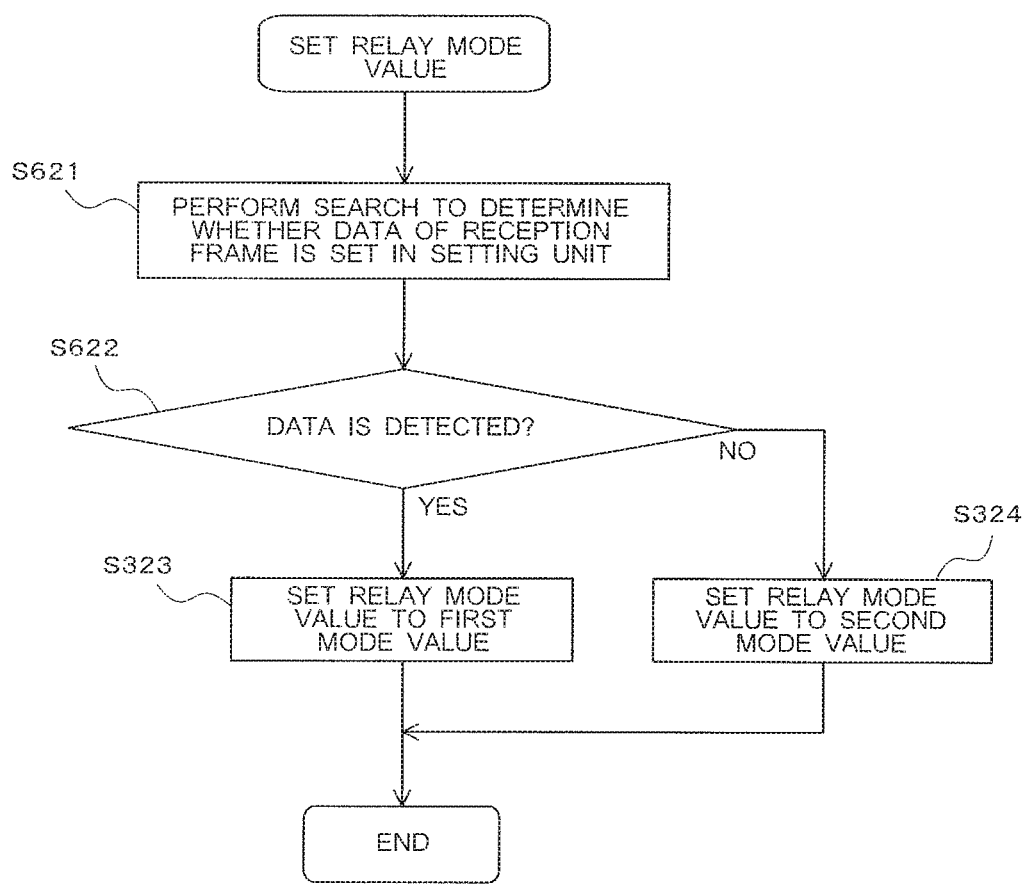
FIG. 21 is a flowchart for illustrating an operation of processing of setting a relay mode value by a relay setting unit of FIG. 20.

FIG. 21 is a flowchart for illustrating an operation of processing of setting the relay mode value 106 by the relay setting unit 604 of FIG. 20. The entire operation of the communication relay apparatus 600 is similar to that of the communication relay apparatus 100 illustrated in FIG. 8. Thus, a description is given below of the processing of setting the relay mode value 106 illustrated in Step S108 and Step S115 of FIG. 8 with reference to FIG. 21. The same steps as those of FIG. 14 in Embodiment 3 described above are denoted by the same reference signs, and a description of the steps is omitted here.

[Step S108 of FIG. 8]

First, a description is given of the processing of setting the relay mode value 106A by the relay setting unit 604A.

The relay setting unit 604A acquires a reception frame from the reception unit 101A, and performs a search to determine whether the data of the reception frame is set in the first setting unit 625 (Step S621 of FIG. 21). When the data of the reception frame is set in the first setting unit 625 and the data of the reception frame is detected (YES in Step S622 of FIG. 21), the relay setting unit 604A sets the relay mode value 106A to the first mode value (Step S323 of FIG. 21). On the contrary, when the data of the reception frame is not set in the first setting unit 625 and the data of the reception frame is not detected (NO in Step S622 of FIG. 21), the relay setting unit 604A sets the relay mode value 106A to the second mode value (Step S324 of FIG. 21).

[Step S115 of FIG. 8]

Next, a description is given of the processing of setting the relay mode value 106B by the relay setting unit 604B.

The relay setting unit 604B acquires a reception frame from the reception unit 101B, and performs a search to determine whether the data of the reception frame is set in the second setting unit 626 (Step S621 of FIG. 21). When the data of the reception frame is detected (YES in Step S622 of FIG. 21), the relay setting unit 604B sets the relay mode value 106B to the first mode value (Step S323 of FIG. 21). On the contrary, when the data of the reception frame is not detected (NO in Step S622 of FIG. 21), the relay setting unit 604B sets the relay mode value 106B to the second mode value (Step S324 of FIG. 21).

As described above, the communication relay apparatus 600 switches the operation mode of relay processing depending on the relay mode value 106 set by the relay setting unit 604, and thus frames that are required to be relayed can all be relayed, whereas frames that are not necessarily required to be relayed can be relayed or blocked on the basis of the destination information on communication devices. Consequently, it is possible to relay, to a communication device that performs control in synchronization with communication addressed to another component, communication that triggers the control, and to achieve reduction of communication traffic.

Further, the communication relay apparatus 600 according to Embodiment 6 can switch the operation mode of the communication relay apparatus 600 to the bridge mode or the repeater mode on the basis of the data of the reception frame. That is, the relay setting unit 604 according to Embodiment 6 is configured to access trigger communication information set in advance and indicating the type of communication that triggers synchronized control, which is control performed in synchronization with communication addressed to another component. Then, the relay setting unit 604 reads, from a frame received by the reception unit 101, the type information indicating the type of communication of the frame, and sets the relay mode value 106 to the first mode value when the read type information is contained in the trigger communication information. Consequently, the communication relay apparatus 600 can dynamically switch the operation mode of relay processing in the air-conditioning system depending on the frame. Thus, the communication relay apparatus 600 can relay only the communication that triggers synchronized control, and relay or block other communication on the basis of the destination information on communication devices. That is, it is possible to reduce communication traffic of communication that does not trigger synchronized control while relaying communication that triggers synchronized control to a synchronized communication device.

In Embodiment 6, as an example, data for communication that triggers synchronized control is stored as the value of the first setting unit 625 or the value of the second setting unit 626. However, the configuration is not limited to this example. For example, the address of a trigger communication device may be set as the value of the first setting unit 625 or the value of the second setting unit 626 in addition to the data for communication that triggers synchronized control. Then, the relay setting unit 604 may identify communication that triggers synchronized control on the basis of SA and DATA, and set the relay mode value 106. That is, the trigger communication information and the type information indicating the type of communication of a reception frame may be configured by SA and DATA. The characteristic details of the configuration of Embodiment 6 can be incorporated into the details of the configuration of Embodiments 1 to 5 described above.

Embodiment 7

Figure 22:
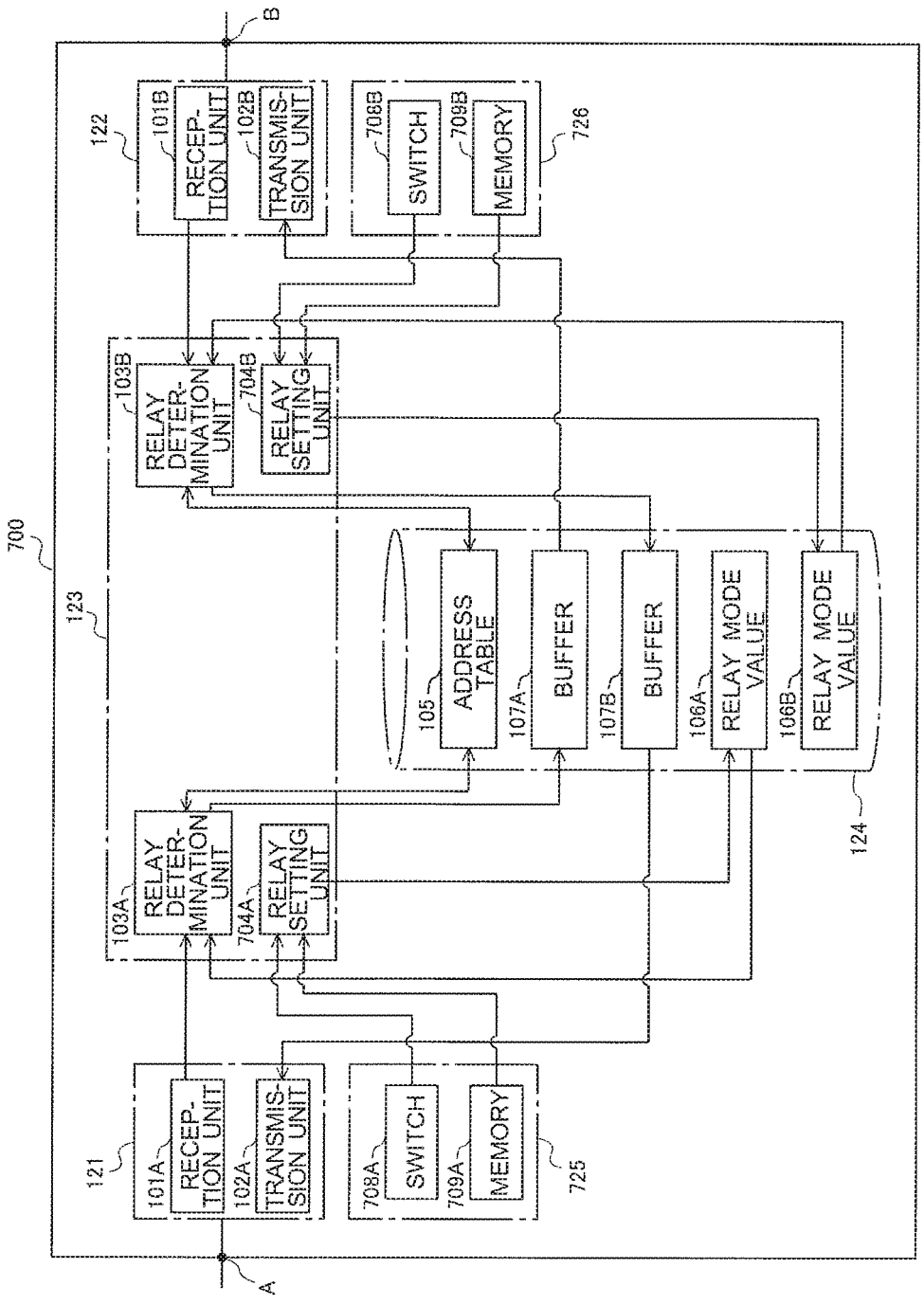
FIG. 22 is a block diagram for illustrating a functional configuration of a communication relay apparatus according to Embodiment 7 of the present invention.

FIG. 22 is a block diagram for illustrating a functional configuration of a communication relay apparatus 700 included in an air-conditioning system according to Embodiment 7 of the present invention. A physical configuration of the communication relay apparatus 700 is similar to the configuration illustrated in FIG. 2. That is, the communication relay apparatus 700 includes a first setting unit 725 and a second setting unit 726 instead of the first setting unit 125 and the second setting unit 126. Further, instead of the relay setting units 104A and 104B, the microcomputer 123 includes relay setting units 704A and 704B having similar functions to those of the relay setting units 104A and 104B.

The communication relay apparatus 600 according to Embodiment 6 described above gives in advance data to be stored into the first setting unit 625 and the second setting unit 626. However, in such a configuration, when the data for communication that triggers synchronized control dynamically changes due to the system configuration, the synchronized communication device may not be able to perform synchronized control.

In view of the above, the communication relay apparatus 700 according to Embodiment 7 is configured to set the data for communication that triggers synchronized control by using a communication frame. A specific description is given below of the functional configuration of the communication relay apparatus 700 with reference to FIG. 22. Components equivalent to those in Embodiments 1 to 6 are denoted by the same reference signs, and a description of the components is omitted here.

The first setting unit 725 includes a switch 708A and a memory 709A. The switch 708A mechanically holds the value of the first setting unit 725. The memory 709A stores the value of the first setting unit 725. The second setting unit 726 includes a switch 708B and a memory 709B. The switch 708B mechanically holds the value of the second setting unit 726. The memory 709B stores the value of the second setting unit 726.

The first setting unit 725 is only required to include at least the memory 709A among the switch 708A and the memory 709A, and the second setting unit 726 is only required to include at least the memory 709B among the switch 708B and the memory 709B. The specific details of the configurations of the first setting unit 725 and the second setting unit 726 are similar to those of the first setting unit 325 and the second setting unit 326 in Embodiment 3 described above.

The value of the first setting unit 725 is set in the memory 709A by the relay setting unit 704A. Further, the value of the first setting unit 725 may be set in any manner by the switch 708A as in Embodiment 1, or the data for communication that triggers synchronized control may be set in advance as the value of the first setting unit 725 as in Embodiment 6.

Further, the value of the second setting unit 726 is set in the memory 709B by the relay setting unit 704B. Further, the value of the second setting unit 726 may be set in any manner by the switch 708B as in Embodiment 1, or the data for communication that triggers synchronized control may be set in advance as the value of the second setting unit 726 as in Embodiment 6.

Further, the value of the first setting unit 725 and the value of the second setting unit 726 may be set to common values, or different values. That is, the value of the setting unit may be set individually for each communication port. Then, only one or a plurality of pieces of the data for communication that triggers synchronized control may be set as the value of the first setting unit 725 or the value of the second setting unit 726. Further, no piece of the data for communication that triggers synchronized control may be set in at least one of the first setting unit 725 and the second setting unit 726.

Figure 23:
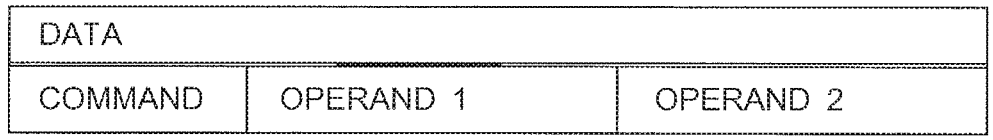
FIG. 23 is an explanatory diagram for illustrating details of data of data setting included in a frame received by a reception unit of the communication relay apparatus of FIG. 22.

FIG. 23 is an explanatory diagram for illustrating details of data for data setting that is included in a frame received by the reception unit 101 of the communication relay apparatus 700 of FIG. 22. The data for the data setting is data corresponding to the value of the first setting unit 725 and the value of the second setting unit 726. As illustrated in FIG. 23, the data for the data setting includes command information, information of the operand 1, and information of the operand 2.

The data for the data setting includes "add data" and "delete data" as a command type. That is, the data for the data setting includes information indicating "add data" or "delete data" as command information. The data for the data setting includes, as information on the operand 1, information indicating the communication port A, information indicating the communication port B, or information indicating both the ports. The data for the data setting stores the value of the data as the information on the operand 2.

When the command for the data setting is "add data," the relay setting unit 704 adds the value of the data, which is set in the operand 2, to the communication port set in the operand 1. On the contrary, when the command for the data setting is "delete data," the relay setting unit 704 deletes the value of the data set in the operand 2 from the communication port set in the operand 1.

The relay setting unit 704A receives a reception frame from the reception unit 101A, and identifies whether details of the data of the reception frame are the data for the data setting illustrated in FIG. 23. Further, when the data of the reception frame is the data for the data setting, the relay setting unit 704A sets the value of the first setting unit 725 or the value of the second setting unit 726 on the basis of the details of the data setting.

Further, similarly to Embodiment 6, when the reception frame includes data set in the first setting unit 725, the relay setting unit 704A sets the relay mode value 106A to the first mode value. Further, similarly to Embodiment 6, when the reception frame does not include the data set in the first setting unit 725, the relay setting unit 704A sets the relay mode value 106A to the second mode value.

The relay setting unit 704B receives a reception frame from the reception unit 101B, and identifies whether details of the data of the reception frame are the data for the data setting illustrated in FIG. 23. Further, when the data of the reception frame is the data for the data setting, the relay setting unit 704B sets the value of the first setting unit 725 or the value of the second setting unit 726 on the basis of the details of the data setting.

Further, similarly to Embodiment 6, when the reception frame includes data set in the first setting unit 725, the relay setting unit 704B sets the relay mode value 106B to the first mode value. Further, similarly to Embodiment 6, when the reception frame does not include the data set in the second setting unit 726, the relay setting unit 704B sets the relay mode value 106B to the second mode value.

Figure 24:
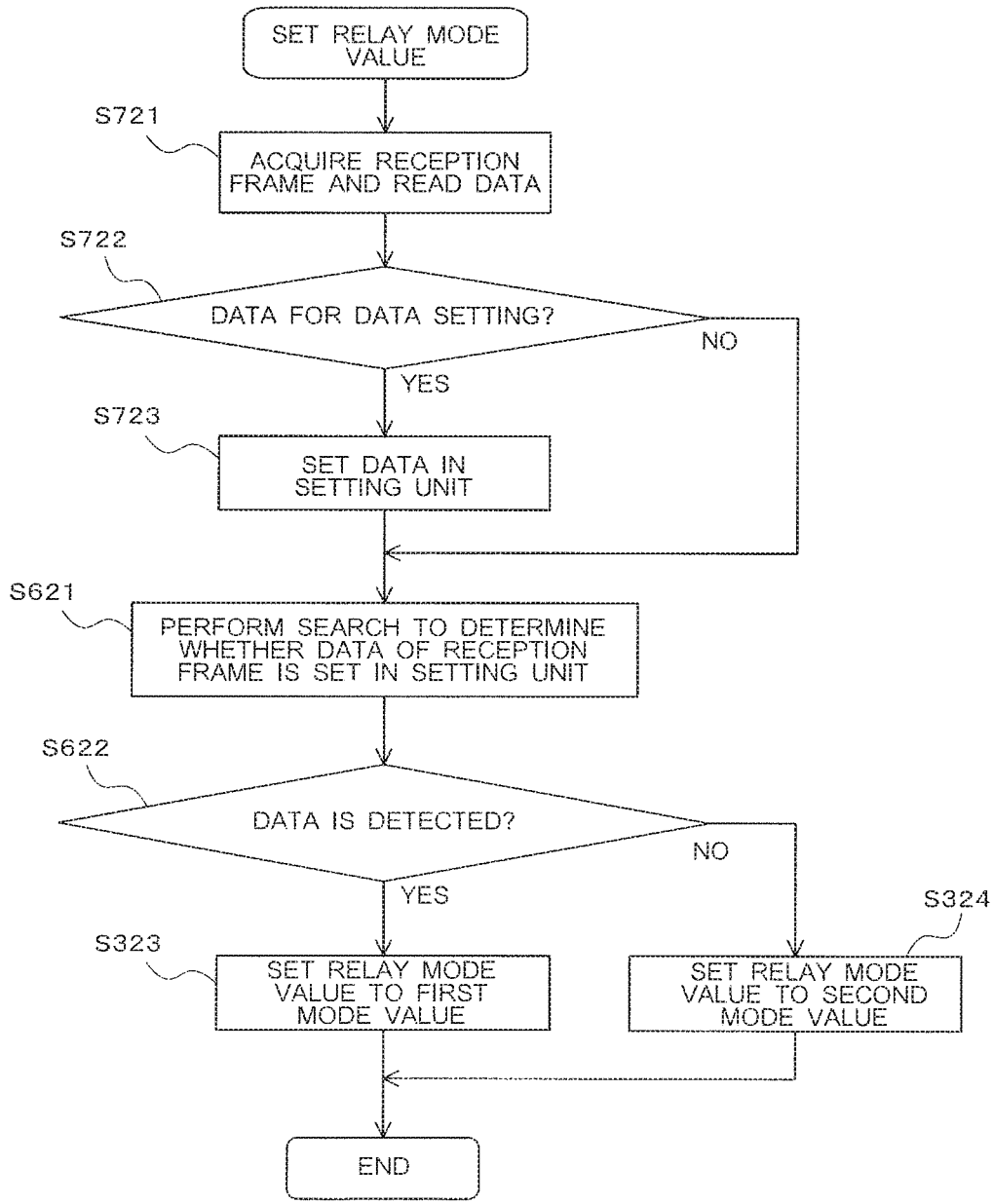
FIG. 24 is a flowchart for illustrating an operation of processing of setting a relay mode value by a relay setting unit of FIG. 22.

FIG. 24 is a flowchart for illustrating an operation of processing of setting the relay mode value 106 by the relay setting unit 704 of FIG. 22. The entire operation of the communication relay apparatus 700 is similar to that of the communication relay apparatus 100 illustrated in FIG. 8. Thus, a description is given below of the processing of setting the relay mode value 106 illustrated in Step S108 and Step S115 of FIG. 8 with reference to FIG. 24. The same steps as those of FIG. 21 in Embodiment 6 and FIG. 14 in Embodiment 3 described above are denoted by the same reference signs, and a description of the steps is omitted here.

[Step S108 of FIG. 8]

First, a description is given of the processing of setting the relay mode value 106A by the relay setting unit 704A.

The relay setting unit 704A receives a reception frame from the reception unit 101A, and reads the data of the reception frame (Step S721 of FIG. 24). Next, the relay setting unit 704A checks whether the details of the data of the reception frame are a command for the data setting by the setting unit (Step S722 of FIG. 24). At this time, when the data of the reception frame is a command for the data setting by the setting unit (YES in Step S722 of FIG. 24), the relay setting unit 704A adds or deletes the data to or from the first setting unit 725 or the second setting unit 726 on the basis of the details of the data setting (Step S723 of FIG. 24). On the contrary, when the data is not a command for the data setting by the setting unit (NO in Step S722 of FIG. 24), the relay setting unit 704A does not perform any processing, and proceeds to Step S621. That is, similarly to the relay setting unit 604A in Embodiment 6, the relay setting unit 704A performs a series of operations illustrated in Step S621, Step S622, Step S323, and Step S324.

[Step S115 of FIG. 8]

Next, a description is given of the processing of setting the relay mode value 106B by the relay setting unit 704B.

The relay setting unit 704B receives a reception frame from the reception unit 101B, and reads the data of the reception frame (Step S721 of FIG. 24). Next, the relay setting unit 704B checks whether the details of the data of the reception frame are a command for the data setting by the setting unit (Step S722 of FIG. 24). At this time, when the data of the reception frame is a command for the data setting by the setting unit (YES in Step S722 of FIG. 24), the relay setting unit 704B adds or deletes the data to or from the first setting unit 725 or the second setting unit 726 on the basis of the details of the data setting (Step S723 of FIG. 24). On the contrary, when the data is not a command for the data setting by the setting unit (NO in Step S722 of FIG. 24), the relay setting unit 704B does not perform any processing, and proceeds to Step S621. That is, similarly to the relay setting unit 604B in Embodiment 6, the relay setting unit 704B performs the series of operations illustrated in Step S621, Step S622, Step S323, and Step S324.

As described above, the communication relay apparatus 700 switches the operation mode of relay processing depending on the relay mode value 106 set by the relay setting unit 704, and thus frames that are required to be relayed can all be relayed, whereas frames that are not necessarily required to be relayed can be relayed or blocked on the basis of the destination information on communication devices. Consequently, it is possible to relay, to a communication device that performs control in synchronization with communication addressed to another component, communication that triggers the control, and to achieve reduction of communication traffic.

Further, the communication relay apparatus 700 according to Embodiment 7 can execute the data setting for communication that triggers synchronized control by using a frame transmitted to the communication relay apparatus 700 or a frame to be relayed through the communication relay apparatus 700. That is, the relay setting unit 704 in Embodiment 7 has a function of acquiring trigger communication information indicating the type of communication that triggers synchronized control, which is control performed in synchronization with communication addressed to another component, from a frame received by the reception unit 101. Then, the relay setting unit 704 reads, from a frame received by the reception unit 101, the type information indicating the type of communication of the frame, and sets the relay mode value 106 to the first mode value when the read type information is contained in the trigger communication information. Thus, with the communication relay apparatus 700, even when communication that triggers synchronized control changes due to a change in air-conditioning system, all the communication devices connected to the air-conditioning system can set the value of the first setting unit 725 and the value of the second setting unit 726.

For example, the communication relay apparatus 700 can set all the communication from a trigger communication device to be relayed also when the data for communication that triggers synchronized control is newly set by, for example, an operator as in Patent Literature 1.

In Embodiment 7, as an example, the data for communication that triggers synchronized control is stored as the value of the first setting unit 725 or the value of the second setting unit 726, but the configuration is not limited to this example. For example, the address of a trigger communication device may be set as the value of the first setting unit 725 or the value of the second setting unit 726 in addition to the data for communication that triggers synchronized control. Then, the relay setting unit 704 may identify communication that triggers synchronized control on the basis of SA and DATA, and set the relay mode value 106. The characteristic details of the configuration of Embodiment 7 can be incorporated into the details of the configuration of Embodiments 1 to 6 described above.

Embodiment 8

Figure 25:
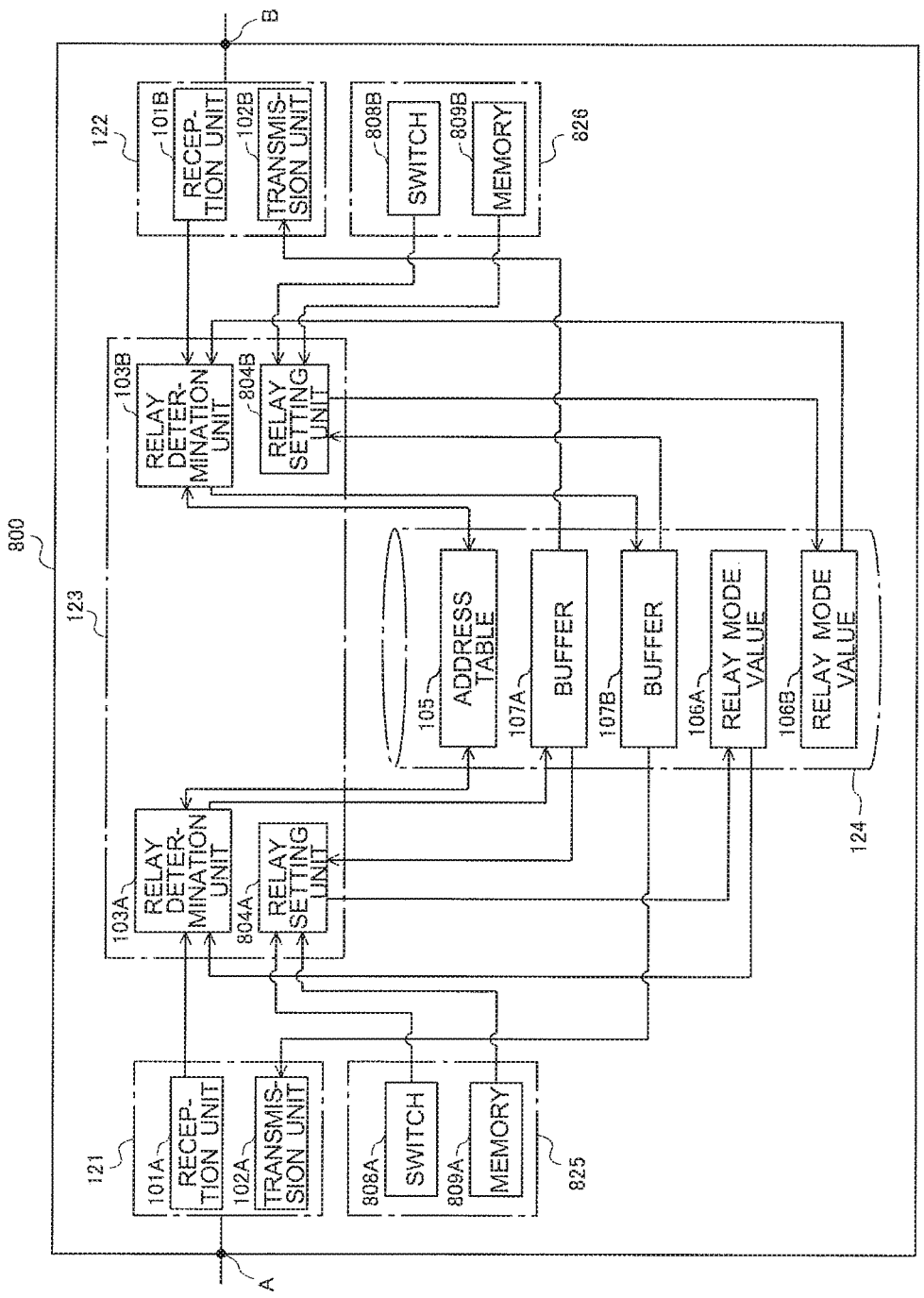
FIG. 25 is a block diagram for illustrating a functional configuration of a communication relay apparatus according to Embodiment 8 of the present invention.

FIG. 25 is a block diagram for illustrating a functional configuration of a communication relay apparatus 800 included in an air-conditioning system according to Embodiment 8 of the present invention. A physical configuration of the communication relay apparatus 800 is similar to the configuration illustrated in FIG. 2. That is, the communication relay apparatus 800 includes a first setting unit 825 and a second setting unit 826 instead of the first setting unit 125 and the second setting unit 126. Further, instead of the relay setting units 104A and 104B, the microcomputer 123 includes relay setting units 804A and 804B having similar functions to those of the relay setting units 104A and 104B.

In Embodiments 1 to 7 described above, when the remaining capacity of a buffer of the communication relay apparatus becomes 0, the communication relay apparatus cannot receive a new frame, and as a result, a communication failure occurs.

In view of the above, the relay setting unit 804 of the communication relay apparatus 800 according to Embodiment 8 is configured to switch the relay mode value 106 to the second mode value indicating the bridge mode when the remaining capacity of the buffer is about to be empty. Through such switching processing, it is possible to reduce the number of frames accumulated in the buffer to lower a probability that the remaining capacity of the buffer becomes 0, and thus it is possible to lower the probability of occurrence of a communication abnormality.

A specific description is given below of the functional configuration of the communication relay apparatus 800 with reference to FIG. 25. Components equivalent to those in Embodiments 1 to 7 are denoted by the same reference signs, and a description of the components is omitted here.

In this case, the remaining capacity of the buffer 107A is a value obtained by subtracting the used capacity from the capacity of the buffer 107A, and the remaining capacity of the buffer 107B is a value obtained by subtracting the used capacity from the capacity of the buffer 107B. The buffer 107A and the buffer 107B may have the same capacity, or have different capacities.

The first setting unit 825 includes a switch 808A and a memory 809A. The switch 808A mechanically holds the value of the first setting unit 825. The memory 809A stores the value of the first setting unit 825. The second setting unit 826 includes a switch 808B and a memory 809B. The switch 808B mechanically holds the value of the second setting unit 826. The memory 809B stores the value of the second setting unit 826.

The first setting unit 825 may include at least one of the switch 808A and the memory 809A, and the second setting unit 826 may include at least one of the switch 808B and the memory 809B. The specific details of the configurations of the first setting unit 825 and the second setting unit 826 are similar to those of the first setting unit 325 and the second setting unit 326 in Embodiment 3 described above. That is, the first setting unit 825 and the second setting unit 826 can be mechanically configured, or configured by a memory.

A value set in any one of Embodiments 1 to 7 and a first margin value meaning a threshold value for the remaining capacity of the buffer 107A allowing operation in the repeater mode are set in the first setting unit 825 as the values of the first setting unit 825.

A value set in any one of Embodiments 1 to 7 and a second margin value meaning a threshold value for the remaining capacity of the buffer 107B allowing operation in the repeater mode are set in the second setting unit 826 as the values of the second setting unit 826.

In this case, the maximum values of the first margin value and the second margin value are buffer capacities, and the minimum values of the first margin value and the second margin value are 0. The first margin value and the second margin value are references for determining whether there is an enough remaining capacity of the buffer, and are determined in any manner by, for example, the designer of the air-conditioning system. The first margin value and the second margin value may be set to the same value, or may be set to different values depending on, for example, the configuration of the air-conditioning system.

The relay setting unit 804A is configured to check the buffer 107A, and change or maintain the setting of the relay mode value 106A depending on the change in remaining capacity of the buffer 107A. That is, the relay setting unit 804A is configured to compare the remaining capacity of the buffer 107A with the first margin value, and adjust the setting of the relay mode value 106A depending on the result of comparison.

The relay setting unit 804B is configured to check the buffer 107B, and change or maintain the setting of the relay mode value 106B depending on the change in remaining capacity of the buffer 107B. That is, the relay setting unit 804B is configured to compare the remaining capacity of the buffer 107B with the second margin value, and adjust the setting of the relay mode value 106B depending on the result of comparison.

When the first margin value is set to 0, which is the minimum value, the first setting unit 825 always sets the relay mode value 106A to the first mode value indicating the repeater mode. Further, when the first margin value is set to the buffer capacity, which is the maximum value, the first setting unit 825 always sets the relay mode value 106A to the second mode value indicating the bridge mode.

When the second margin value is set to 0, which is the minimum value, the second setting unit 826 always sets the relay mode value 106B to the first mode value indicating the repeater mode. Further, when the second margin value is set to the buffer capacity, which is the maximum value, the second setting unit 826 always sets the relay mode value 106B to the second mode value indicating the bridge mode.

Figure 26:
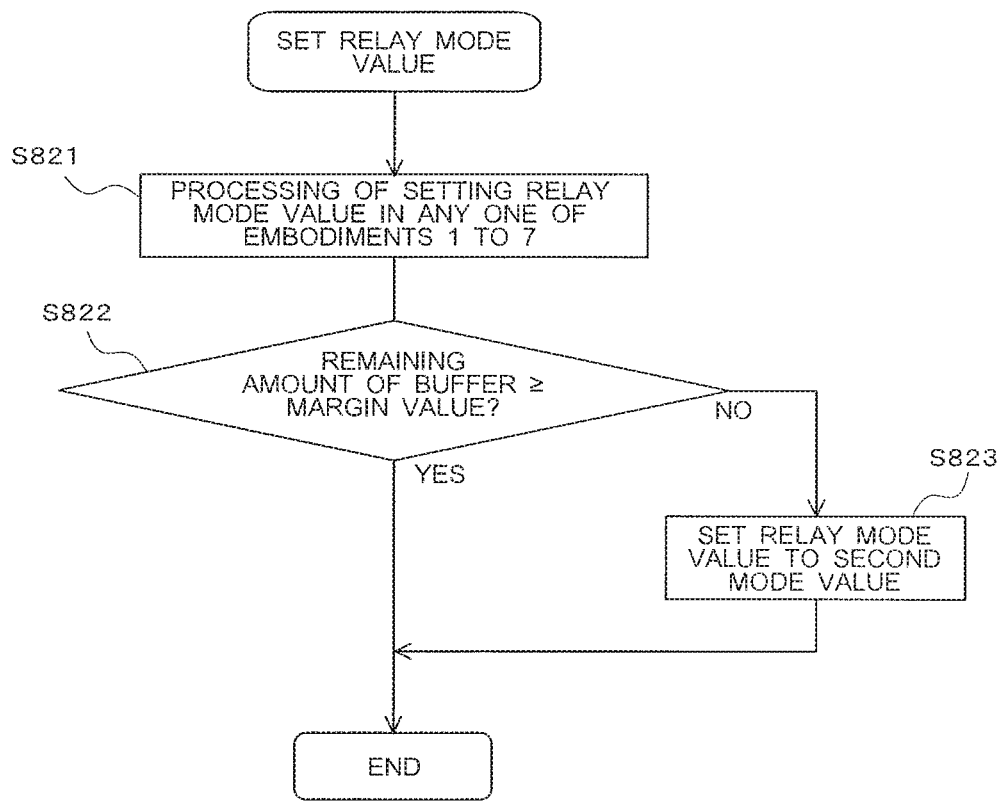
FIG. 26 is a flowchart for illustrating an operation of processing of setting a relay mode value by a relay setting unit of FIG. 25.

FIG. 26 is a flowchart for illustrating an operation of processing of setting the relay mode value 106 by the relay setting unit 804 of FIG. 25. The entire operation of the communication relay apparatus 800 is similar to that of the communication relay apparatus 100 illustrated in FIG. 8. Thus, a description is given below of the processing of setting the relay mode value 106 illustrated in Step S108 and Step S115 of FIG. 8 with reference to FIG. 26.

[Step S108 of FIG. 8]

First, a description is given of processing of setting the relay mode value 106A by the relay setting unit 804A.

The relay setting unit 804A performs processing of setting the relay mode value 106A described in any one of Embodiments 1 to 7 (Step S821 of FIG. 26). Next, the relay setting unit 804A identifies the remaining capacity of the buffer 107A, and when the remaining capacity of the buffer 107A is equal to or larger than the first margin value (YES in Step S822 of FIG. 26), the relay setting unit 804A does not change the relay mode value 106A.

On the contrary, when the remaining capacity of the buffer 107A is smaller than the first margin value (NO in Step S822 of FIG. 26), the relay setting unit 804A sets the relay mode value 106A to the second mode value indicating the bridge mode (Step S823 of FIG. 26). That is, in a case where the remaining capacity of the buffer 107A is smaller than the first margin value, when the relay mode value 106A is set to the first mode value, the relay setting unit 804A changes the relay mode value 106A to the second mode value, whereas when the relay mode value 106A is set to the second mode value, the relay setting unit 804A maintains the setting. That is, in a case where the operation mode is set to the repeater mode, the relay setting unit 804A can change the operation mode to the bridge mode when there is no enough remaining capacity of the buffer.

[Step S115 of FIG. 8]

Next, a description is given of processing of setting the relay mode value 106B by the relay setting unit 804B.

The relay setting unit 804B performs processing of setting the relay mode value 106B described in any one of Embodiments 1 to 7 (Step S821 of FIG. 26). Next, the relay setting unit 804B identifies the remaining capacity of the buffer 107B, and when the remaining capacity of the buffer 107B is equal to or larger than the second margin value set in advance (YES in Step S822 of FIG. 26), the relay setting unit 804B does not change the relay mode value 106B.

On the contrary, when the remaining capacity of the buffer 107B is smaller than the second margin value (NO in Step S822 of FIG. 26), the relay setting unit 804B sets the relay mode value 106B to the second mode value indicating the bridge mode (Step S823 of FIG. 26). That is, in a case where the remaining capacity of the buffer 107B is smaller than the second margin value, when the relay mode value 106B is set to the first mode value, the relay setting unit 804B changes the relay mode value 106B to the second mode value, whereas when the relay mode value 106B is set to the second mode value, the relay setting unit 804B maintains the setting. That is, in a case where the operation mode is set to the repeater mode, the relay setting unit 804B can change the operation mode to the bridge mode when there is no enough remaining capacity of the buffer.

As described above, the communication relay apparatus 800 according to Embodiment 8 sets the relay mode values 106A and 106B by the processing described in any one of Embodiments 1 to 7, and then sets the relay mode values 106A and 106B by using a margin value. Consequently, the communication relay apparatus 800 can obtain effects equivalent to those of Embodiments 1 to 7 when the remaining capacity of the buffer is equal to or larger than the margin value.

Further, when the remaining capacity of the buffer is smaller than the margin value serving as a reference for switching the operation mode, the relay setting unit 804 in Embodiment 8 sets the relay mode value 106 to the second mode value. Thus, the communication relay apparatus 800 can lower the probability of occurrence of a communication abnormality when the remaining capacity of the buffer is smaller than the margin value. That is, when the remaining capacity of the buffer is smaller than the margin value, the communication relay apparatus 800 can switch the operation mode to the bridge mode to reduce communication traffic. Consequently, it is possible to reduce the number of frames stored and accumulated in the buffers 107A and 107B.

Meanwhile, when the communication relay apparatus 800 switches the operation mode to the bridge mode, communication that triggers synchronized control may be blocked. However, the air-conditioning system is affected more greatly when a communication failure occurs due to depletion of the buffer than when communication that triggers synchronized control does not reach the synchronized communication device. Consequently, in Embodiment 8, the communication relay apparatus 800 is configured to prioritize reducing communication traffic.

That is, according to the communication relay apparatus 800, it is possible to enhance synchronized control and reduce communication traffic more effectively by relaying communication that triggers synchronized control to the maximum extent possible. Then, smooth relay processing that depends on the configuration of the air-conditioning system can be achieved by adjusting the setting of the margin value. The characteristic details of the configuration of Embodiment 8 can be incorporated into the details of the configuration of Embodiments 1 to 7 described above.

Embodiment 9

Figure 27:
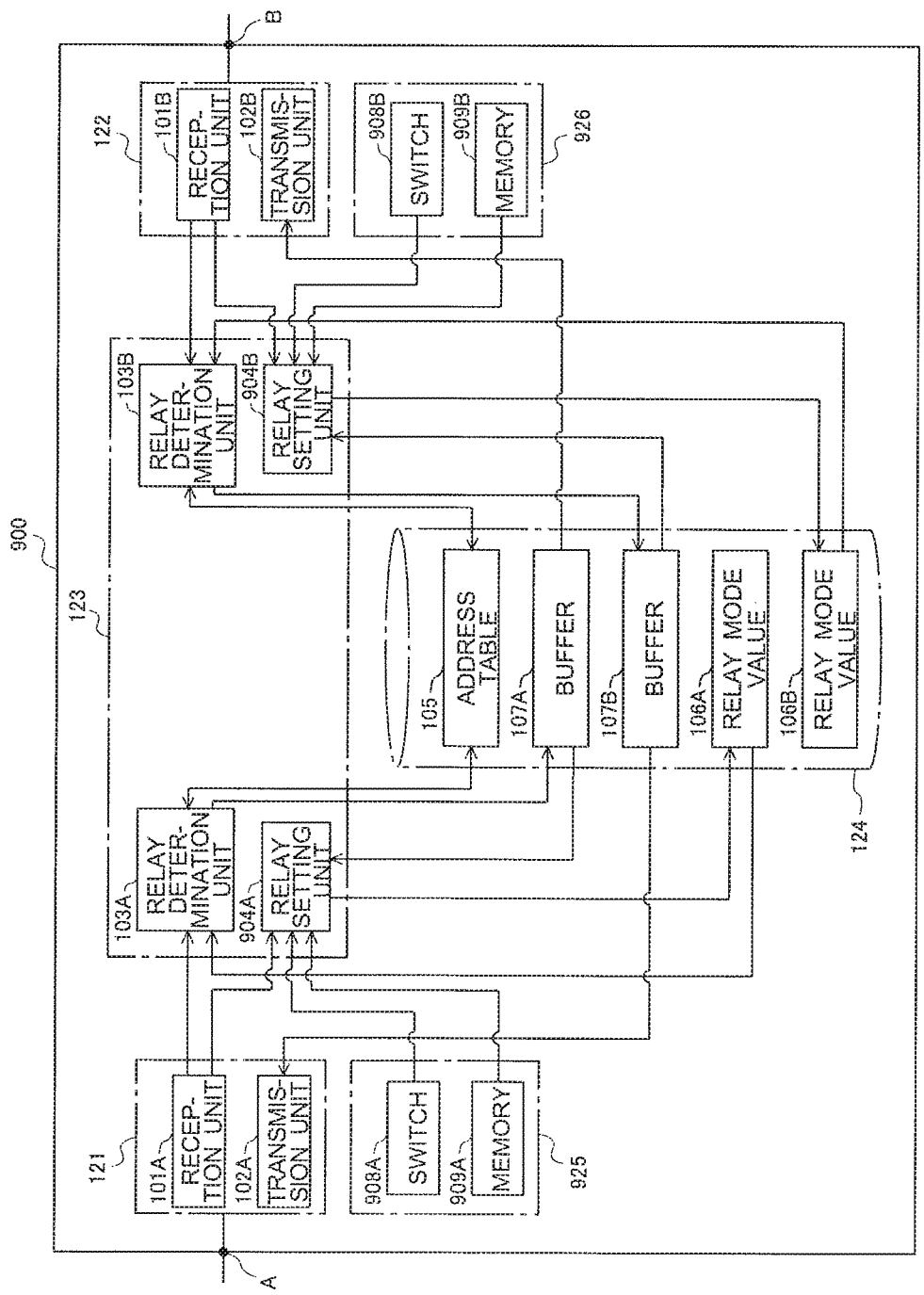
FIG. 27 is a block diagram for illustrating a functional configuration of a communication relay apparatus according to Embodiment 9 of the present invention.

FIG. 27 is a block diagram for illustrating a functional configuration of a communication relay apparatus 900 included in an air-conditioning system according to Embodiment 9 of the present invention. A physical configuration of the communication relay apparatus 900 is similar to the configuration illustrated in FIG. 2. That is, the communication relay apparatus 900 includes a first setting unit 925 and a second setting unit 926 instead of the first setting unit 125 and the second setting unit 126. Further, instead of the relay setting units 104A and 104B, the microcomputer 123 includes relay setting units 904A and 904B having similar functions to those of the relay setting units 104A and 104B.

In the communication relay apparatus 800 in Embodiment 8 described above, the margin values stored in the first setting unit 825 and the second setting unit 826 are given in advance, but restriction on the remaining capacity of the buffer may change dynamically due to the system configuration.

In view of the above, the communication relay apparatus 900 according to Embodiment 9 is configured to set the margin value by using a communication frame. A specific description is given below of the functional configuration of the communication relay apparatus 900 with reference to FIG. 27. Components equivalent to those in Embodiments 1 to 8 are denoted by the same reference signs, and a description of the components is omitted here.

The first setting unit 925 includes a switch 908A and a memory 909A. The switch 908A mechanically holds the value of the first setting unit 925. The memory 909A stores the value of the first setting unit 925. The second setting unit 926 includes a switch 908B and a memory 909B. The switch 908B mechanically holds the value of the second setting unit 926. The memory 909B stores the value of the second setting unit 926.

The first setting unit 925 is only required to include at least the memory 909A among the switch 908A and the memory 909A, and the second setting unit 926 is only required to include at least the memory 909B among the switch 908B and the memory 909B. The specific details of the configurations of the first setting unit 925 and the second setting unit 926 are similar to those of the first setting unit 325 and the second setting unit 326 in Embodiment 3 described above.

The value of the first setting unit 925 is set in the memory 909A by the relay setting unit 904A. In addition, the value of the first setting unit 925 may be set in any manner by the switch 908A as in Embodiment 1, or the address of a trigger communication device may be set in advance as the value of the first setting unit 925 as in Embodiment 3. Further, the data for communication that triggers synchronized control may be set in advance by the switch 908A as the value of the first setting unit 925 as in Embodiment 6.

The value of the second setting unit 926 is set in the memory 909B by the relay setting unit 904B. In addition, the value of the second setting unit 926 may be set in any manner by the switch 908B as in Embodiment 1, or the address of a trigger communication device may be set in advance as the value of the second setting unit 926 as in Embodiment 3. Further, the data for communication that triggers synchronized control may be set in advance by the switch 908B as the value of the second setting unit 926 as in Embodiment 6.

Further, the value of the first setting unit 925 and the value of the second setting unit 926 may be set to common values, or different values. That is, the value of the setting unit may be set individually for each communication port. Further, only one or more addresses of the trigger communication devices may be set as the value of the first setting unit 925 or the value of the second setting unit 926. Further, at least one of the first setting unit 925 and the second setting unit 926 may store no set address of the trigger communication device.

FIG. 28 is an explanatory diagram for illustrating details of data for margin setting included in a frame received by the reception unit 101 of the communication relay apparatus 900 of FIG. 27. The data for margin setting is data corresponding to the value of the first setting unit 925 and the value of the second setting unit 926. As illustrated in FIG. 28, the data for margin setting includes command information, information of the operand 1, and information of the operand 2.

The data for margin setting includes "change margin" indicating change of the margin value as a command type. That is, the data for margin setting includes information indicating margin change as command information. The data for margin setting includes, as the information of the operand 1, information indicating the communication port A, information indicating the communication port B, or information indicating both the ports. The data for margin setting includes a margin value as the information of the operand 2.

When a command for margin setting is "change margin," the relay setting unit 904 changes a margin value of the setting unit corresponding to a communication port set in the operand 1 to a margin value set in the operand 2.

The relay setting unit 904A receives a reception frame from the reception unit 101A, and identifies whether the details of the data of the reception frame are the data for margin setting illustrated in FIG. 28. Then, when the data of the reception frame is the data for margin setting, the relay setting unit 904A sets the value of the first setting unit 925 or the value of the second setting unit 926 in accordance with the details of margin setting. Further, similarly to the relay setting unit 804A in Embodiment 8, the relay setting unit 904A has a function of changing or maintaining the setting of the relay mode value 106A depending on the change in remaining value of the buffer 107A.

The relay setting unit 904B receives a reception frame from the reception unit 101B, and identifies whether the details of the data of the reception frame are the data for margin setting illustrated in FIG. 28. Then, when the data of the reception frame is the data for margin setting, the relay setting unit 904B sets the value of the first setting unit 925 or the value of the second setting unit 926 in accordance with the details of margin setting. Further, similarly to the relay setting unit 804B in Embodiment 8, the relay setting unit 904B has a function of changing or maintaining the setting of the relay mode value 106B depending on the change in remaining value of the buffer 107B.

FIG. 29 is a flowchart for illustrating an operation of processing of setting the relay mode value 106 by the relay setting unit 904 of FIG. 27. The entire operation of the communication relay apparatus 900 is similar to that of the communication relay apparatus 100 illustrated in FIG. 8. Thus, a description is given below of the processing of setting the relay mode value 106 illustrated in Step S108 and Step S115 of FIG. 8 with reference to FIG. 29. The same steps as those of FIG. 26 in Embodiment 8 described above are denoted by the same reference signs, and a description of the steps is omitted here.

[Step S108 of FIG. 8]

First, a description is given of the processing of setting the relay mode value 106A by the relay setting unit 904A.

The relay setting unit 904A receives a reception frame from the reception unit 101A, and reads the data of the reception frame (Step S921 of FIG. 29). Next, the relay setting unit 904A checks whether the details of the data of the reception frame are a command for margin setting by the setting unit (Step S922 of FIG. 29). At this time, when the data of the reception frame is a command for margin setting (YES in Step S922 of FIG. 29), the relay setting unit 904A sets the margin value in the first setting unit 925 or the second setting unit 926 in accordance with the details of the data for margin setting. At this time, when the margin value is already set in the setting unit designated by the command, the relay setting unit 904A changes and updates the margin value of the setting unit (Step S923 of FIG. 29). On the contrary, when the data of the reception frame is not a command for margin setting (NO in Step S922 of FIG. 29), the relay setting unit 904A does not perform any processing, and proceeds to Step S821. Then, similarly to Embodiment 8, the relay setting unit 904A performs a series of operations illustrated in Step S821 to Step S823.

[Step S115 of FIG. 8]

Next, a description is given of the processing of setting the relay mode value 106B by the relay setting unit 904B.

The relay setting unit 904B receives a reception frame from the reception unit 101B, and reads the data of the reception frame (Step S921 of FIG. 29). Next, the relay setting unit 904B checks whether the details of the data of the reception frame are a command for margin setting by the setting unit (Step S922 of FIG. 29). At this time, when the data of the reception frame is a command for margin setting (YES in Step S922 of FIG. 29), the relay setting unit 904B sets the margin value in the first setting unit 925 or the second setting unit 926 in accordance with the details of the data for margin setting. At this time, when the margin value is already set in the setting unit designated by the command, the relay setting unit 904B changes and updates the margin value of the setting unit (Step S923 of FIG. 29). On the contrary, when the data of the reception frame is not a command for margin setting (NO in Step S922 of FIG. 29), the relay setting unit 904B does not perform any processing, and proceeds to Step S821. Then, similarly to Embodiment 8, the relay setting unit 904B performs a series of operations illustrated in Step S821 to Step S823.

As described above, the communication relay apparatus 900 according to Embodiment 9 can set the margin value, which is a threshold value for the remaining capacity of the buffer, by using a frame transmitted to the communication relay apparatus 900 or a frame to be relayed through the communication relay apparatus 900. The relay setting unit 904 in Embodiment 9 has a function of acquiring the margin value serving as a reference for switching the operation mode on the basis of a frame received by the reception unit 101. Consequently, with the communication relay apparatus 900, even when the margin value changes due to the change in air-conditioning system, all the communication devices connected to the air-conditioning system can set the margin value, among the value of the first setting unit 925 and the value of the second setting unit 926, by transmitting a frame. The characteristic details of the configuration of Embodiment 9 can be incorporated into the details of the configuration of Embodiments 1 to 8 described above.

The above-mentioned embodiments are preferred specific examples of the communication relay apparatus and the air-conditioning system, and the technical scope of this invention is not limited to those embodiments. For example, in FIG. 1, as an example, the air-conditioning system 10 includes the central controllers 91 and 92, the outdoor unit 93, and the indoor units 94 to 96 as a plurality of communication devices. However, the number of outdoor units, indoor units, and central controllers is not limited to this example. That is, the air-conditioning system 10 may include any number of outdoor units, indoor units, and central controllers.

Further, in FIG. 1, as an example, the communication devices are divided into the two segments 90A and 90B, but the configuration is not limited to this example. In the air-conditioning system 10, a plurality of freely installed communication devices may be divided into three or more segments. When the air-conditioning system 10 includes three or more segments, the communication relay apparatus according to each of the above-mentioned embodiments preferably includes three or more communication ports each corresponding to a corresponding one of the three or more segments. Then, the communication relay apparatus according to each of the above-mentioned embodiments may include three or more setting unit configured in the same manner as the first setting unit 125 and the second setting unit 126, and each corresponding to a corresponding one of the three or more segments. Further, the communication relay apparatus according to each of the above-mentioned embodiments may include the three or more relay determination units 103 configured in the same manner as the relay determination unit 103, and each corresponding to a corresponding one of three or more communication ports. Further, the communication relay apparatus according to each of the above-mentioned embodiments may include three or more relay setting units configured in the same manner as each relay setting unit, and each corresponding to a corresponding one of three or more communication ports.

The communication relay apparatus according to each of the above-mentioned embodiments may include one relay determination unit 103 having functions of the plurality of relay determination units 103. Further, the communication relay apparatus according to each of the above-mentioned embodiments may include one relay setting unit having functions of the plurality of relay setting units. Further, in each of the above-mentioned embodiments, as an example, the plurality of transmission units 102 and the plurality of reception units 101 are provided. However, the configuration is not limited to this example. The communication relay apparatus according to each of the above-mentioned embodiments may include, for example, one transmission unit 102 acting as the plurality of transmission units 102 and one transmission unit 102 acting as the plurality of reception units 101.

Further, in each of the above-mentioned embodiments, as an example, the RAM 124 acts as a plurality of buffers. However, the configuration is not limited to this example. The RAM 124 may act as a common buffer used in common through communication via all the communication ports. In this case, each relay determination unit 103 preferably stores, into the common buffer, a received frame and identification information on communication ports through which the frame is relayed. Then, each transmission unit 102 preferably transmits a frame selected on the basis of the identification information from the common buffer. With this configuration, the received frames can be stored until the common buffer has reached its capacity. Thus, it is possible to avoid a situation in which there is a buffer whose remaining capacity is 0 although there is a sufficient remaining capacity in at least one buffer, and to reduce occurrence of a communication failure more effectively.

Further, in each of the above-mentioned embodiments, as an example, various kinds of information are stored in the RAM 124. However, the configuration is not limited to this example. That is, for example, various kinds of information stored in the RAM 124 may be stored in a memory incorporated in the microcomputer 123. Further, various kinds of information may be appropriately assigned and stored into the memory incorporated in the microcomputer 123 and the RAM 124 by, for example, assigning the memory incorporated in the microcomputer 123 to the buffer. In addition, the memory incorporated in the microcomputer 123 may be caused to act as the buffer, and the memory may store the address table 105 and the relay mode value 106. With such a configuration, the communication relay apparatus can be constructed without the RAM 124 illustrated in FIG. 2, and thus it is possible to reduce costs.

Further, in each of the above-mentioned embodiments, a description has been given of a case in which the relay setting unit reads a value set in the setting unit from the setting unit. However, the configuration is not limited to the described case. The relay setting unit may be configured to assign the value of the setting unit to a program area of the microcomputer 123. Then, for example, each communication relay apparatus may be configured without the setting unit illustrated in, for example, FIG. 3. It is possible to reduce costs by configuring each communication relay apparatus in this manner.

The invention claimed is:

1. A communication relay apparatus configured to relay communication between a plurality of segments of a network by a plurality of communication devices including an indoor unit and an outdoor unit connected to one another via the network, the communication relay apparatus comprising:
   a plurality of communication ports each corresponding to a corresponding one of the plurality of segments;
   a plurality of reception units each configured to receive a frame from a corresponding one of the plurality of segments;
   an address table in which information on addresses of the plurality of communication devices in each of the plurality of segments is registered in association with a corresponding one of the plurality of communication ports;
   a buffer configured to temporarily store the frame;
   a relay setting unit configured to set, as a relay mode value corresponding to an operation mode of processing of relaying the frame, a first mode value corresponding to processing of relaying all frames and a second mode value corresponding to processing of relaying a frame on a basis of a destination address of the frame;
   a relay determination unit configured to perform processing of relaying the frame in an operation mode corresponding to the relay mode value set by the relay setting unit; and
   a plurality of transmission units each configured to transmit the frame temporarily stored in the buffer to one of the plurality of segments that is different from an other one of the plurality of segments that is a transmission source of the frame,
   wherein the relay determination unit firstly determines whether the relay mode value is the first mode value,
   wherein if the relay mode value is determined to be the first mode value, the relay determination unit stores the frame in the buffer, and if the relay mode value is determined not to be the first mode value, the relay determination unit secondly determines whether the destination address of the frame is registered in the address table, and
   wherein if the destination address of the frame is determined to be registered in the address table, the relay determination unit stores the frame in the buffer, and if the destination address of the frame is determined not to be registered in the address table, the relay determination unit does not store the frame in the buffer.

2. The communication relay apparatus of claim 1,
   wherein the relay setting unit is configured to set the relay mode value on a basis of information indicating the operation mode that is included in the frame received by one of the plurality of reception units.

3. The communication relay apparatus of claim 1,
   wherein the plurality of communication devices include
      a synchronized communication device configured to perform synchronized control that is control performed in synchronization with communication addressed to a component other than the synchronized communication device, and
      a trigger communication device configured to perform communication that triggers the synchronized communication device to perform the synchronized control,
   wherein the relay setting unit is provided for each of the plurality of communication ports, and
   wherein each of the relay setting units is configured to access information on an address of the trigger communication device that is set in advance, and is configured to set the relay mode value to the first mode value when the information on the address of the trigger communication device is present in a storage area of the address table for one of the plurality of communication ports corresponding to each of the relay setting units.

4. The communication relay apparatus of claim 1,
   wherein the plurality of communication devices include
      a synchronized communication device configured to perform synchronized control that is control performed in synchronization with communication addressed to a component other than the synchronized communication device, and
      a trigger communication device configured to perform communication that triggers the synchronized communication device to perform the synchronized control,
   wherein the relay setting unit is provided for each of the plurality of communication ports, and
   wherein each of the relay setting units has a function of acquiring information on an address of the trigger communication device from the frame received by a corresponding one of the plurality of reception units, and is configured to set the relay mode value to the first mode value when the acquired information on the address of the trigger communication device is present in a storage area of the address table for one of the plurality of communication ports corresponding to each of the relay setting units.

5. The communication relay apparatus of claim 1,
   wherein the plurality of communication devices include
      a synchronized communication device configured to perform synchronized control that is control performed in synchronization with communication addressed to a component other than the synchronized communication device, and
      a trigger communication device configured to perform communication that triggers the synchronized communication device to perform the synchronized control, wherein the relay setting unit is configured to access information on an address of the trigger communication device that is set in advance, and wherein the relay setting unit is configured to acquire, from the frame received by one of the plurality of reception units, transmission source address information on an address of one of the plurality of communication devices that has transmitted the frame, and to set the relay mode value to the first mode value when the acquired transmission source address information is contained in the information on the address of the trigger communication device.

6. The communication relay apparatus of claim 1, wherein the plurality of communication devices include
- a synchronized communication device configured to perform synchronized control that is control performed in synchronization with communication addressed to a component other than the synchronized communication device, and
- a trigger communication device configured to perform communication that triggers the synchronized communication device to perform the synchronized control, wherein the relay setting unit has a function of acquiring information on an address of the trigger communication device from the frame received by one of the plurality of reception units, and wherein the relay setting unit is configured to acquire, from the frame received by one of the plurality of reception units, transmission source address information on an address of one of the plurality of communication devices that has transmitted the frame, and to set the relay mode value to the first mode value when the acquired transmission source address information is contained in the information on the address of the trigger communication device.

7. The communication relay apparatus of claim 1, wherein the relay setting unit is configured to access trigger communication information set in advance and indicating a type of communication that triggers synchronized control that is control performed in synchronization with communication addressed to an other component, and wherein the relay setting unit is configured to read, from the frame received by one of the plurality of reception units, type information indicating a type of communication of the frame, and to set the relay mode value to the first mode value when the read type information is contained in the trigger communication information.

8. The communication relay apparatus of claim 1, wherein the relay setting unit has a function of acquiring, from the frame received by one of the plurality of reception units, trigger communication information indicating a type of communication that triggers synchronized control that is control performed in synchronization with communication addressed to an other component, and wherein the relay setting unit is configured to read, from the frame received by one of the plurality of reception units, type information indicating a type of communication of the frame, and to set the relay mode value to the first mode value when the read type information is contained in the trigger communication information.

9. The communication relay apparatus of claim 1, wherein the relay setting unit is configured to set the relay mode value to the second mode value when a remaining capacity of the buffer is smaller than a margin value serving as a reference for switching the operation mode.

10. The communication relay apparatus of claim 1, wherein the relay setting unit has a function of acquiring a margin value serving as a reference for switching the operation mode, from the frame received by one of the plurality of reception units, and wherein the relay setting unit is configured to set the relay mode value to the second mode value when a remaining capacity of the buffer is smaller than the margin value.

11. An air-conditioning system, comprising the plurality of communication devices including the indoor unit and the outdoor unit connected to one another via the network, the network being divided into the plurality of segments by the communication relay apparatus of claim 1.

* * * * *